US012170898B2

United States Patent
Yu et al.

(10) Patent No.: US 12,170,898 B2
(45) Date of Patent: Dec. 17, 2024

(54) METHODS AND DEVICES FOR ESTABLISHING SECURE COMMUNICATION FOR APPLICATIONS

(71) Applicant: ZTE Corporation, Shenzhen (CN)

(72) Inventors: Wantao Yu, Shenzhen (CN); Shilin You, Shenzhen (CN); Yuze Liu, Shenzhen (CN); Jin Peng, Shenzhen (CN); Zhaoji Lin, Shenzhen (CN); Yuxin Mao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 337 days.

(21) Appl. No.: 17/861,496

(22) Filed: Jul. 11, 2022

(65) Prior Publication Data

US 2022/0345888 A1 Oct. 27, 2022

Related U.S. Application Data

(63) Continuation of application No. PCT/CN2020/073026, filed on Jan. 19, 2020.

(51) Int. Cl.
*H04W 12/069* (2021.01)
(52) U.S. Cl.
CPC .................. *H04W 12/069* (2021.01)
(58) Field of Classification Search
None
See application file for complete search history.

(56) References Cited

U.S. PATENT DOCUMENTS

2009/0019284 A1 1/2009 Cho et al.
2019/0335330 A1* 10/2019 Salkintzis ............. H04W 12/08
(Continued)

FOREIGN PATENT DOCUMENTS

CN 109803350 A 5/2019
CN 110474875 A 11/2019
(Continued)

OTHER PUBLICATIONS

International Search Report and Written Opinion regarding PCT/CN2020/073026 dated Sep. 30, 2020, 6 pages.
Huawei, Hisilicon, "3GPP TSG-SA WG3 Meeting #96 Ad Hoc, S3-193475," *Implirnled AKMA auJhenlirnliun procedure*, Oct. 7, 2019, pp. 1-3.
(Continued)

*Primary Examiner* — Kenneth B Wells
(74) *Attorney, Agent, or Firm* — Crowell & Moring LLP

(57) ABSTRACT

The present disclosure describes methods, systems and devices for establishing secure communication between a user equipment and a service application in a wireless communication. One method includes receiving, by the user equipment, an authentication and key management for service applications identifier (AKMAID) from an authentication server function (AUSF) upon successful completion of an authentication process for registering the user equipment with the communication network. The method also includes storing, by the user equipment, the AKMAID; deriving, by the user equipment, an application key based on a base authentication key; sending, by the user equipment, a communication request to the service application, the communication request comprising the AKMAID; and receiving, by the user equipment, an application session establishment response to the communication request from the service application to establish a security communication session between the user equipment and the service application based on the application key.

20 Claims, 17 Drawing Sheets

(56) References Cited

U.S. PATENT DOCUMENTS

2022/0159460 A1* 5/2022 Ben Henda ......... H04W 12/041
2022/0174063 A1* 6/2022 Wu ..................... H04W 12/043
2022/0417010 A1* 12/2022 De Kievit ............ H04L 9/3242

FOREIGN PATENT DOCUMENTS

| EP | 3 525 503 A1 | 8/2019 |
|---|---|---|
| JP | 2002334227 A | 11/2002 |
| WO | WO 2019/105695 | 6/2019 |

OTHER PUBLICATIONS

Huawei, Hisilicon, "3GPP TSG SA WG3 (Security) Meeting #94, S3-190197," *Architecture solutionjbr AKMA with non-standaloneftmction*, Jan. 21, 2019, pp. 1-4.

KPN, "3GPP TSG-SA WG3 Meeting #94Ad-Hoc, S3-190926", *New Solution: Efficient key derivationfbr end-to-end security*, Mar. 18, 2019, pp. 3-5.

Huawei, Hisilicon, "3GPP TSG SA WG3 (Security) Meeting #96-Adhoc, S3- 193471," *Conclusion on 7.4,*, Oct. 7, 2019, p. 2.

NEC, "3GPP TSG SA WG3 (Security) Meeting #94 , S3-190214," *Using KAUSF or KSEAF fcn. AKMA*, Jan. 21, 2019, pp. 1-5.

Indian Patent Office First Examination Report regarding 202217036800 dated Dec. 14, 2022.

Extended European Search Report regarding EP 20 88 8294 dated Sep. 6, 2023.

Wang Mingjun et al., "AAKA-D2D: Anonymous Authentication and Key Agreement Protocol in D2D Communications," 2019 IEEE Smartworld, Ubiquitous Intelligence & Computing, Advanced & Trusted Computing, Scalable Computing & Communications, Cloud & Big Data Computing, Internet of People and Smart City Innovation (Smartworld/Scalcom/UIC/ATC/CBDCOM/IOP/SCI), IEEE, Aug. 19, 2019, pp. 1356-1362.

Chinese Office Action and English Translation of Chinese Office Action regarding 202080082596.8 dated Jun. 28, 2024, 35 pages.

Chinese Office Action and English Translation of Chinese Office Action regarding 202080082596.8 dated Oct. 31, 2024, 62 pages.

Aiibaba Group, China Mobile, "Pseudo-CR on Service Authentication for Edge Computing Service," 3GPP TS 23.558, 3GPP TSG-SA WG6 Meeting #35, S6-200099, Hyderabad, India, Jan. 13-17, 2020, 4 pages.

* cited by examiner

METHODS AND DEVICES FOR ESTABLISHING SECURE COMMUNICATION FOR APPLICATIONS

CROSS-REFERENCE TO RELATED APPLICATION

This application is a continuation application of PCT International Patent Application No. PCT/CN2020/073026, filed with the China National Intellectual Property Administration, PRC on Jan. 19, 2020, which is herein incorporated by reference in its entirety.

TECHNICAL FIELD

The present disclosure is directed generally to wireless communications. Particularly, the present disclosure relates to methods and devices for establishing secure communication for applications.

BACKGROUND

Wireless communication technologies are moving the world toward an increasingly connected and networked society. In a communication network, a communication session and data paths may be established to support transmission of data flows between a terminal device and a service application. The transmission of such data flows may be protected by encryption/decryption keys. The generation and validity management of various levels of encryption/decryption keys may be provided by collaborative efforts of various network functions or network nodes in the communication network during registration procedures to authenticate the terminal device to the communication network and during the process of establishing communication sessions between the terminal device and the service application.

SUMMARY

This document relates to methods, systems, and devices for wireless communication, and more specifically, for establishing secure communication for applications.

In one embodiment, the present disclosure describes a method for wireless communication. The method includes establishing secure communication between a user equipment and a service application in a communication network by performing receiving, by the user equipment, an authentication and key management for service applications identifier (AKMAID) from an authentication server function (AUSF) network node upon successful completion of an authentication process for registering the user equipment with the communication network. The method also includes storing, by the user equipment, the AKMAID; deriving, by the user equipment, an application key based on a base authentication key; sending, by the user equipment, a communication request to the service application, the communication request comprising the AKMAID; and receiving, by the user equipment, an application session establishment response to the communication request from the service application to establish a security communication session between the user equipment and the service application based on the application key.

In another embodiment, the present disclosure describes a method for wireless communication. The method includes establishing security communication between a user equipment and a service application in a communication network by performing receiving, by an authentication server function (AUSF) network node, an authentication vector from a user data management/authentication credential repository and processing function (UDM/ARPF) network node. The method also includes storing, by the AUSF network node, an authentication and key management for service applications identifier (AKMAID); and sending, by the AUSF network node, the AKMAID to the user equipment upon successful completion of an authentication process for registering the user equipment with the communication network. Thus, the user equipment is configured to store the AKMAID, derive an application key based on a base authentication key, send a communication request to the service application, the communication request comprising the AKMAID, and receive an application session establishment response to the communication request from the service application to establish a security communication session between the user equipment and the service application based on the application key.

In another embodiment, the present disclosure describes a method for wireless communication. The method includes establishing security communication between a user equipment and a service application in a communication network by performing communicating, by the user equipment, an authentication process with an authentication server function (AUSF) network node for registering the user equipment with the communication network. The method further includes storing, by the user equipment, a random number (RAND) of an authentication vector upon successful completion of the authentication process for registering the user equipment with the communication network; deriving, by the user equipment, an application key based on a base authentication key; sending, by the user equipment, a communication request to the service application, the communication request comprising the RAND; and receiving, by the user equipment, an application session establishment response to the communication request from the service application to establish a security communication session between the user equipment and the service application based on the application key.

In another embodiment, the present disclosure describes a method for wireless communication. The method includes establishing security communication between a user equipment and a service application in a communication network by performing receiving, by an authentication server function (AUSF) network node, an authentication vector from a user data management/authentication credential repository and processing function (UDM/ARPF) network node, the authentication vector comprising a random number (RAND). The method also includes storing, by the AUSF network node, the RAND; and completing, by the AUSF network node, an authentication process for registering the user equipment with the communication network. Thus, the user equipment is configured to store the RAND, derive an application key based on a base authentication key, send a communication request to the service application, the communication request comprising the RAND, and receive an application session establishment response to the communication request from the service application to establish a security communication session between the user equipment and the service application based on the application key.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

DETAILED DESCRIPTION

Figure 1A:
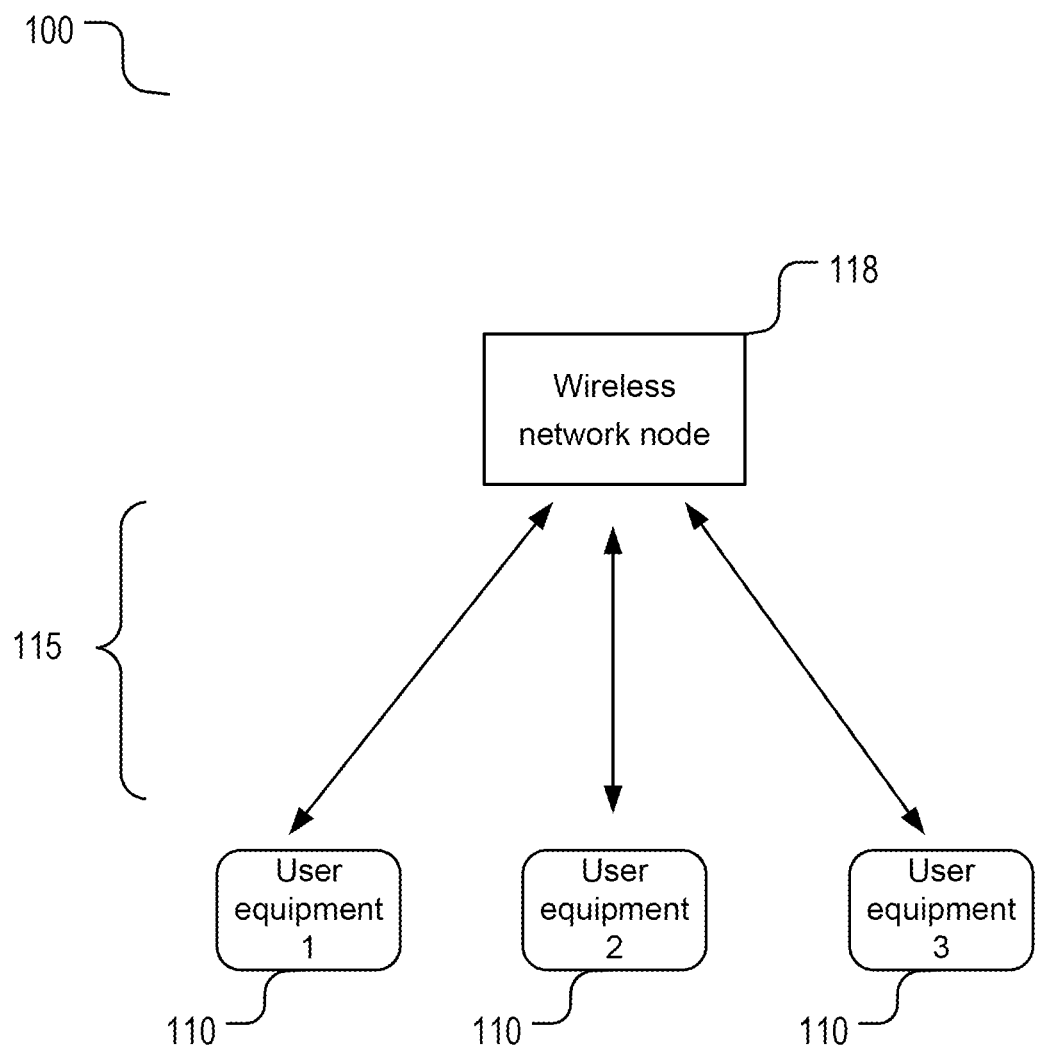
FIG. 1A shows an example of a wireless communication system including one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for establishing secure communication for applications in the communication network.

An authentication and key management for service applications (AKMA) framework may be used to support one or more user equipment (UE) establishing and conducting secure communication session between the one or more UE and one or more service applications. The one or more UE may securely exchange data with one or more service applications. The service applications may be located in one or more application servers.

In the present AKMA architecture, the AKMA authentication may be resulted from an authentication between the UE and the network. This authentication between UE and the network may include a primary/access authentication. There may exist two sets of key identifier associated with the key used in establishing secure transmissions between the UE and the network. One set includes an AKMA key ($K_{AKMA}$) and a corresponding identifier of the AKMA key. The other set includes an authentication server function (AUSF) key (AUSF key, or $K_{AUSF}$) and a corresponding identifier of the AUSF key.

Several issues may occurs with the present AKMA architecture. For one example, when the UE uses the identifier of AKMA key in a request to a service application for establishing the secure communication, an issue occurs if the AUSF has not generated the AKMA key and the AUSF does not correctly respond with the received identifier of AKMA key. For another example, when the identifier of the AUSF key is used in the request for establishing the secure communication, another issue may occur if the AKMA key has already derived, and the identifier of AUSF key may be used to identify the AKMA key, causing a situation of one key identifier identifying two different keys.

The present disclosure describes methods and devices for establishing secure communication for applications in the communication network, addressing at least some of the issues discussed above. In one implementation to address to above issues, an identifier generated during a primary authentication process may be used by the UE and the network for the application session establishment process. For example but not limited to, the identifier generated during the primary authentication process may include an authentication and key management for service applications identifier (AKMAID) or a random number (RAND) in an authentication vector. Optionally and additionally, an AKMA key or an application key may be either pre-derived or may be derived on-demand.

FIG. 1A shows a wireless communication system 100 including a wireless network node 118 and one or more user equipment (UE) 110. The wireless network node may include a base station, which may be a nodeB (NB, e.g., an eNB or gNB) in a mobile telecommunications context. Each of the UE may wirelessly communicate with the wireless network node via one or more radio channels 115. For example, a first UE 110 may wirelessly communicate with a wireless network node 118 via a channel including a plurality of radio channels during a certain period of time.

Figure 1B:
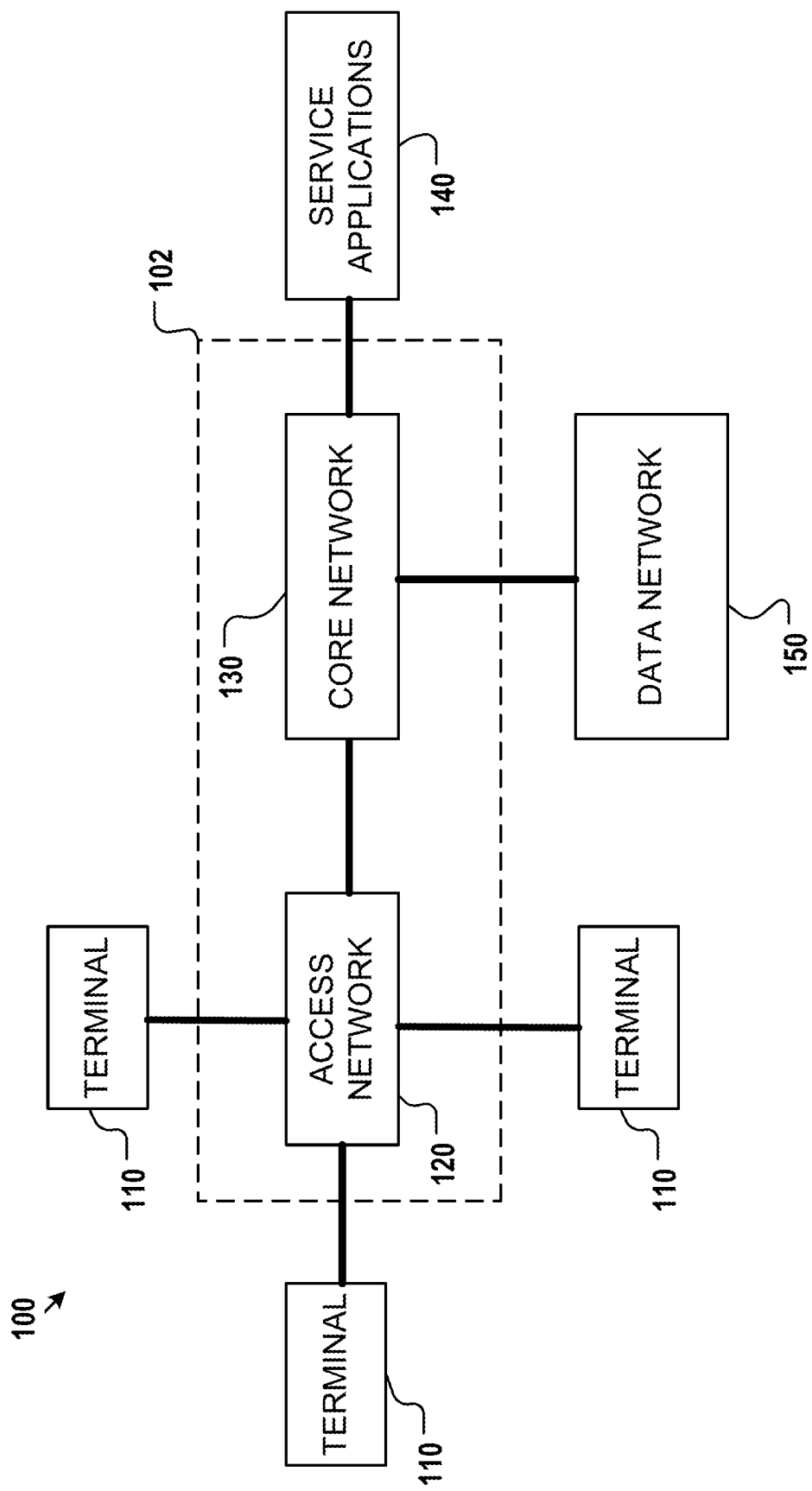
FIG. 1B shows an exemplary communication network including terminal devices, a carrier network, data network, and service applications.

FIG. 1B shows an example of a communication system 100. The communication system 100 may include one or more terminal devices 110 (for example, user equipment), a carrier network 102, various service applications 140, and other data networks 150. The carrier network 102, for example, may include access networks 120 and a core network 130. The carrier network 102 may be configured to transmit voice, data, and other information (collectively referred to as data traffic) between the terminal devices 110 and the carrier network 102, between the terminal devices 110 and the service applications 140, or between the terminal devices 110 and the other data networks 150. Communication sessions and corresponding data paths may be established and configured for such data transmission. The access networks 120 may be configured to provide terminal devices 110 network access to the core network 130. The core network 130 may include various network nodes or network functions configured to control the communication sessions and perform network access management and data traffic routing. The service applications 140 may be hosted by various application servers that are accessible by the terminal devices 110 through the core network 130 of the carrier network 102. One or more service applications 140 may be deployed as a data network outside of the core network 130. Likewise, the other data networks 150 may be accessible by the terminal devices 110 through the core network 130 and may appear as either data destination or data source of a particular communication session instantiated in the carrier network 102.

The core network 130 of FIG. 1 may include various network nodes or functions geographically distributed and interconnected to provide network coverage of a service region of the carrier network 102. These network nodes or functions may be implemented as dedicated hardware network elements. Alternatively, these network nodes or functions may be virtualized and implemented as virtual machines or as software entities. A network node may each be configured with one or more types of network functions. These network nodes or network functions may collectively provide the provisioning and routing functionalities of the core network 130. The term "network nodes" and "network functions" may be used interchangeably in this disclosure.

Figure 2:
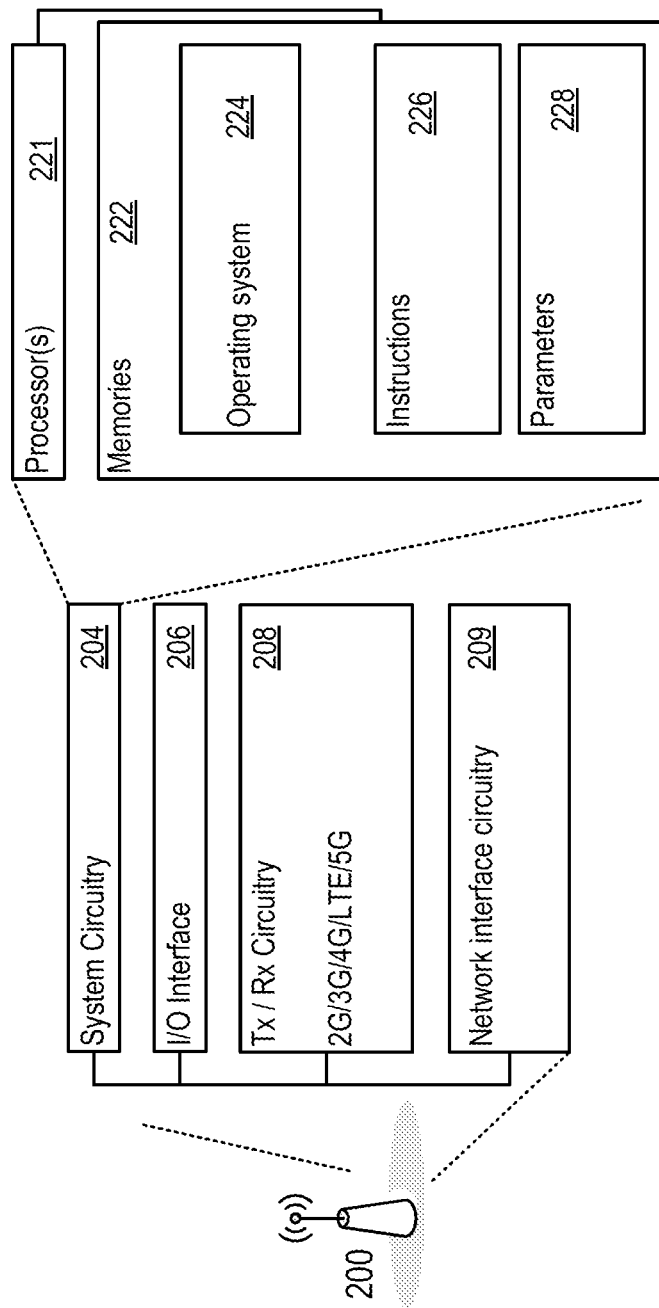
FIG. 2 shows an example of a network node.

FIG. 2 shows an example of electronic device 200 to implement a network node. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
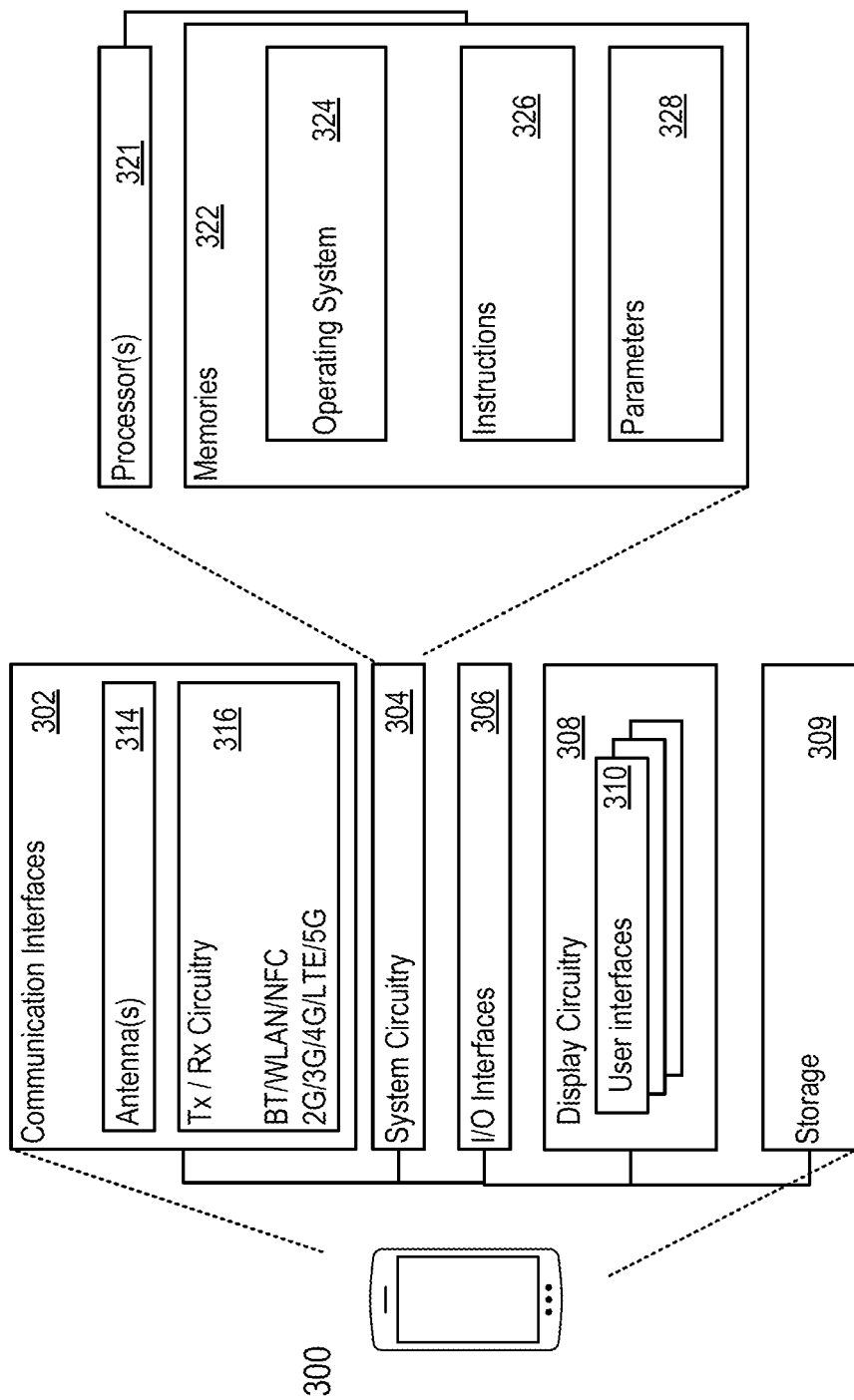
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

Figure 4:
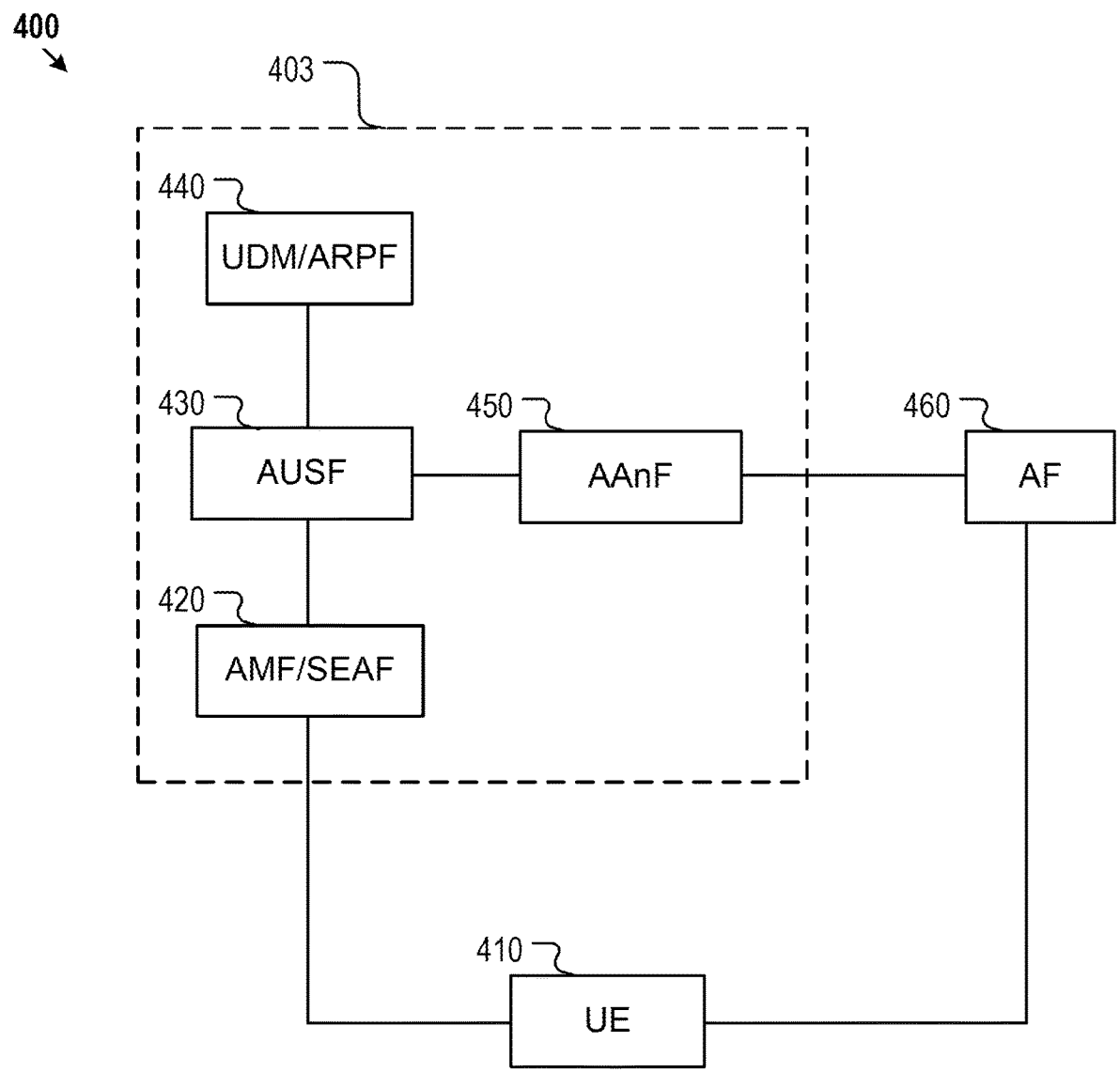
FIG. 4 shows exemplary network functions or network nodes in an authentication and key management for service applications (AKMA) architecture in a wireless communication network.

FIG. 4 shows an exemplary AKMA architecture in a wireless communication system 400. The wireless communication system 400 may include user equipment (UE) 410 (functioning as the terminal device 110 of FIG. 1B), a wireless network 403, and one or more service applications (AF) 460. In one implementation, the wireless network 403 may be part of a core network 130 as in FIG. 1B.

The wireless network 403 may include an access management function (AMF) 420. The AMF may include a security anchor function (SEAF), which collectively may be referred as AMF/SEAF.

The wireless network 403 may include an authentication server function (AUSF) 430. The AUSF may function as an authentication network node (AUNN).

The wireless network 403 may include a universal data management (UDM) function 440. The UDM may function as a network data management network node (NDMNN). In one implementation, UDM may be referred as a user data management. In another implementation, UDM may be referred as a unified data management.

Referring to FIG. 4, the UDM 440 may form a permanent storage or database for user contract and subscription data. The UDM may include an authentication credential repository and processing function (ARPF) for storage of long-term security credentials for user authentication, and for using such long-term security credentials as input to perform computation of encryption keys as described in more detail below. To prevent unauthorized exposure of UDM/ARPF data, the UDM/ARPF 430 may be located in a secure network environment. In one implementation, the UDM/ARPF may not be directly and easily accessed by service applications or user equipment.

Referring to FIG. 4, the wireless network 403 may further include an AKMA Anchor function (AAnF) network node 450. The AAnF 450 may be responsible for generation and management of data encryption/decryption keys for various service applications in collaboration with the AUSF 430 and one or more application functions (AFs) 460 associated with their corresponding service applications. The AAnF 450 may further be responsible for maintenance of the security context for the UE 410. For example, the functionality of the AAnF 450 may be similar to the bootstrapping server function (BSF) in general bootstrapping architecture (GBA). Multiple AAnFs 450 may be deployed in the core network and each AAnF 380 may be associated with and responsible for key management of one or more service applications and corresponding AFs 460. In one implementation, the wireless network 403 may include a network exposure function (NEF) as a gateway for providing capability exposure of the core network to the AF 460 associated with the service applications. In another implementation, the AKMA architecture may include an AKMA authentication function (AAuF) and/or an AKMA application function (AApF).

Figure 5:
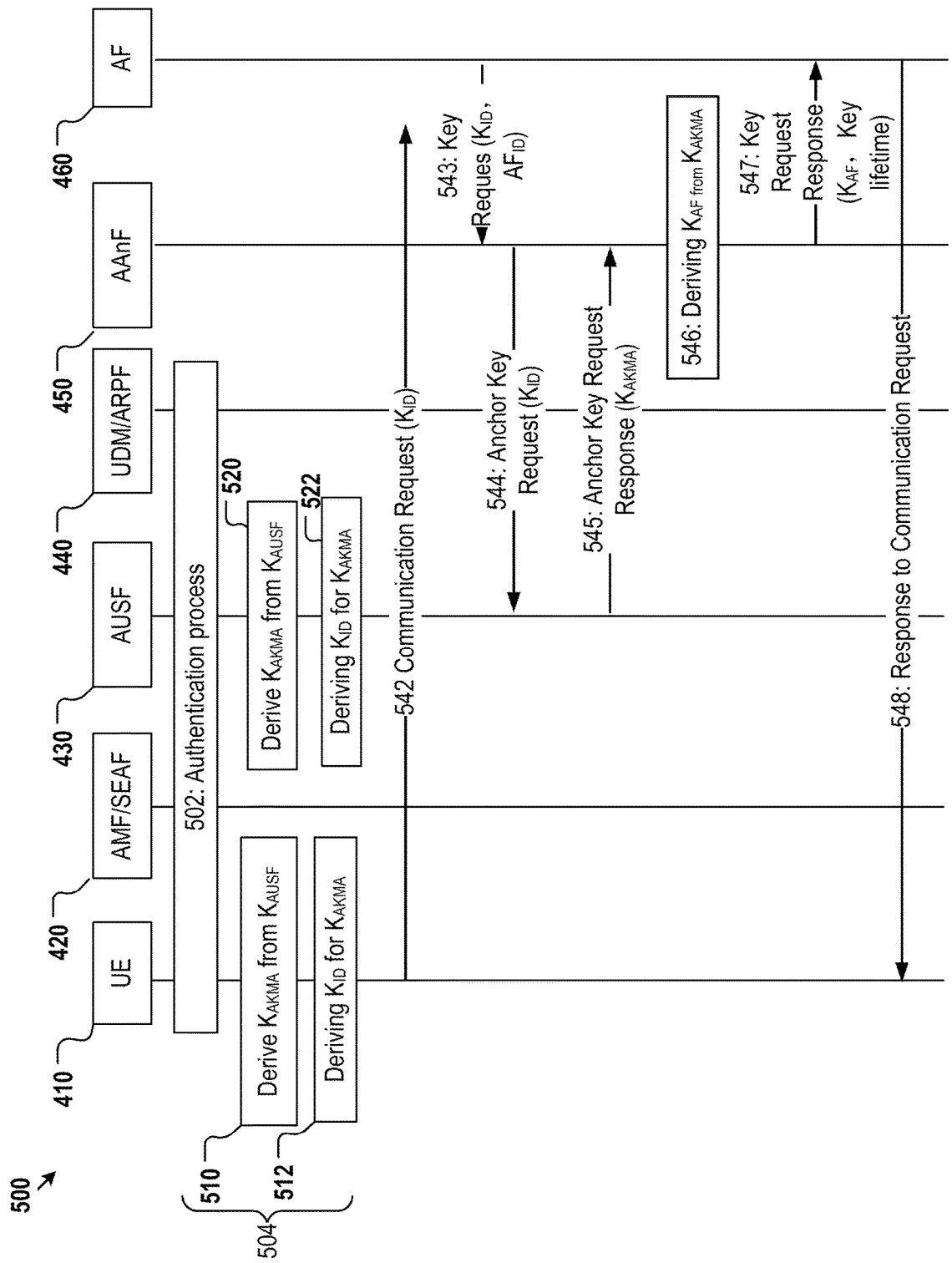
FIG. 5 shows an exemplary logic flow for generation of various levels of encryption keys for enabling encrypted communication between terminal devices and service applications in a wireless communication network.

FIG. 5 illustrates exemplary implementations for the hierarchical AKMA above, describing an implementation 500 for generation of a base key and an anchor key for communication sessions involving a service application and the generation of an application key associated with a service application for enabling encrypted communication between the UE 410 and the corresponding AF 460. Specifically, the implementation 500 may include user authentication procedure 502 and the anchor key generation procedure 504. The user authentication procedure 502, for example, may involve actions from the UE 410, the AMF/SEAF 420, the AUSF 430, and the UDM/ARPF 440. For example, the UE 410, upon entering the wireless communication network, may communicate a network registration and authentication request to the AMF/SEAF 420. Such request may be forwarded by the AMF/SEAF 420 to the AUSF 430 for processing. During the authentication process, the AUSF 430 may obtain user contract and subscription information from the UDM/ARPF 440. The authentication process for a 5G wireless system, for example, may be based on 5G-AKA (Authentication and Key Agreement) protocol or EAP-AKA (Extended Authentication Protocol-AKA). An authentication vector (AV) may be generated by the UDM/ARPF 440 and such authentication vector may be transmitted to the AUSF 430. Following successful user authentication procedure 502, a base key may be generated at both the UE 410 side and the AUSF 430 at the network side. Such a base key may be referred to as a base authentication key (e.g., an AUSF key or $K_{AUSF}$).

As further shown FIG. 5, an anchor key may be derived based on the base key by the UE 410 in an anchor key generation procedure 510. Such an anchor key may be referred to as an AKMA key ($K_{AKMA}$). An identifier for the anchor key may be generated at the UE 410 in an identifier generation procedure 512. Such an identifier may be referred to as $K_{ID}$.

Referring to FIG. 5, in the network side, an anchor key may be derived based on the base key by the AUSF 430 in an anchor key generation procedure 520. Such an anchor key, may be referred to as an AKMA key ($K_{AKMA}$). An identifier for the anchor key may be generated at the AUSF 430 in an identifier generation procedure 522. Such an identifier may be referred to as $K_{ID}$.

Referring to FIG. 5, in Step 542, the UE 410 initiates a communication session with the service application associated with the AF 460 by sending a communication request message. The request may include the identifier $K_{ID}$ that is generated in Step 512 and is associated with the anchor key $K_{AKMA}$ generated in Step 510. In Step 543, the AF 460 may send a key request message to the AAnF 450, where the key request message include the anchor key identifier $K_{ID}$ and/or an identifier of the AF ($AF_{ID}$). In Step 544, the AAnF 450 determines whether the anchor key $K_{AKMA}$ associated with the anchor key identifier $K_{ID}$ can be located in AAnF 450; when it is determined that $K_{AKMA}$ is found in AAnF 450, the logic flow 540 continues to Step 546; when it is determined that $K_{AKMA}$ is not found in AAnF 450, the AAnF 450 may send an anchor key request to AUSF 430 in Step 544 carrying the anchor key identifier $K_{ID}$. The AAnF 450 receives the anchor key $K_{AKMA}$ from the AUSF 430 in Step 545 after the AUSF 354 identifies the anchor key $K_{AKMA}$ according to the anchor key identifier $K_{ID}$ in a response to the anchor key request from the AAnF 450. In Step 546, the AAnF 430 derives the application key ($K_{AF}$) based on the anchor key $K_{AKMA}$ if the $K_{AF}$ has not been previously derived at the AAnF 450 yet or has already expired. The derived $K_{AKMA}$ may be associated with an application key validity time period (or expiration time, or application key lifetime). In Step 547, the AAnF 450 may send the application key $K_{AF}$ and the corresponding expiration time to the AF 460. After obtaining the $K_{AKMA}$ from the AAnF 450, the AF 460 may finally respond to the communication request sent from the UE 410 in Step 542. The response in step 548, for example, may include the expiration time for $K_{AF}$ and such expiration time may be recorded and stored by the UE 410.

In the AKMA architecture, the anchor key generation procedure 510 may not occur at about same time as the anchor key generation procedure 520; and/or the identifier generation procedure 512 may not occur at the same time as the identifier generation procedure 522. Thus, one problem may occur when $K_{ID}$ has been derived at the UE 410 and $K_{AKMA}/K_{ID}$ has not been derived at the AUSF 430. For example, an issue may rise during step 544 when the AUSF 430 has not derived $K_{AKMA}$ and/or $K_{ID}$ yet: when the AUSF 430 receives the anchor key request with $K_{ID}$, the AUSF 430 may not recognize $K_{ID}$ so that the AUSF 430 may be unable to retrieve $K_{ARMA}$ because $K_{ID}$ and/or $K_{ARMA}$ have not been derived yet since step 520 and/or step 522 has not occurred yet.

The present disclosure describes several below embodiments, which may be implemented in a network communication system to address at least part of the problems described above. In order to address to above issues, an identifier generated during a primary authentication process may be used by the UE and the network for the application session establishment process. For example but not limited to, the identifier generated during the primary authentication process may include an authentication and key management for service applications identifier (AKMAID) or a random number (RAND) in an authentication vector. Optionally and additionally, an AKMA key or an application key may be either pre-derived or may be derived on-demand.

Embodiment #1

The present disclosure describe embodiments of methods and devices for establishing secure communication between a user equipment and a service application in a communication network.

Figure 6:
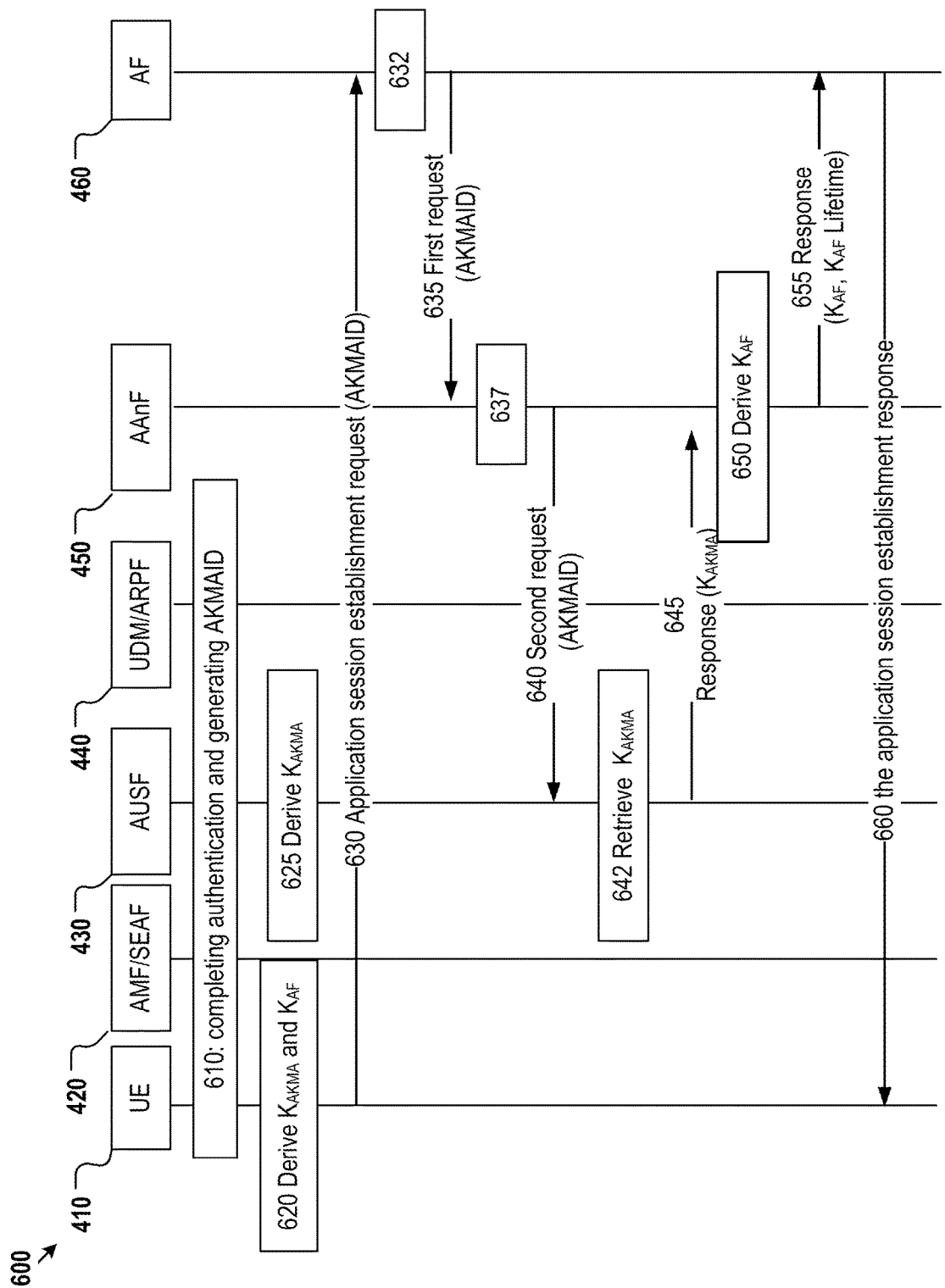
FIG. 6 shows an exemplary logic flow of one embodiment for establishing secure communication between a user equipment and a service application in a communication network.

FIG. 6 shows exemplary logic flows of a method 600 for establishing secure communication between a user equipment and a service application in a communication network. The method 600 may include step 610: successfully completing an authentication and generating an authentication process and key management for service applications identifier (AKMAID). The authentication process may be a primary authentication process for registering the UE 410 with the communication network.

Figure 7A:
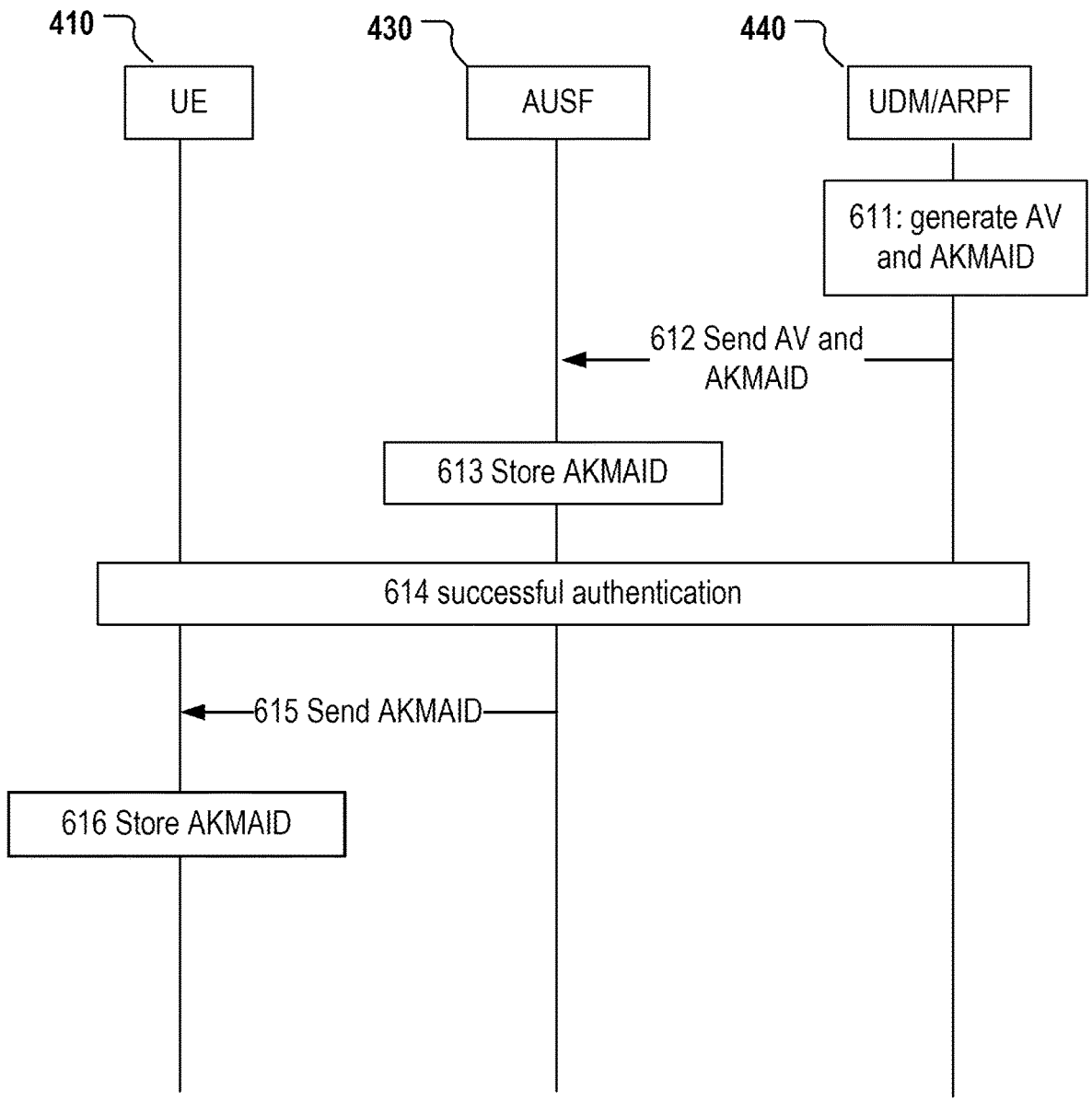
FIG. 7A shows an exemplary logic flow of one implementation for completing an authentication and generating an authentication and key management for service applications identifier (AKMAID).
Figure 7B:
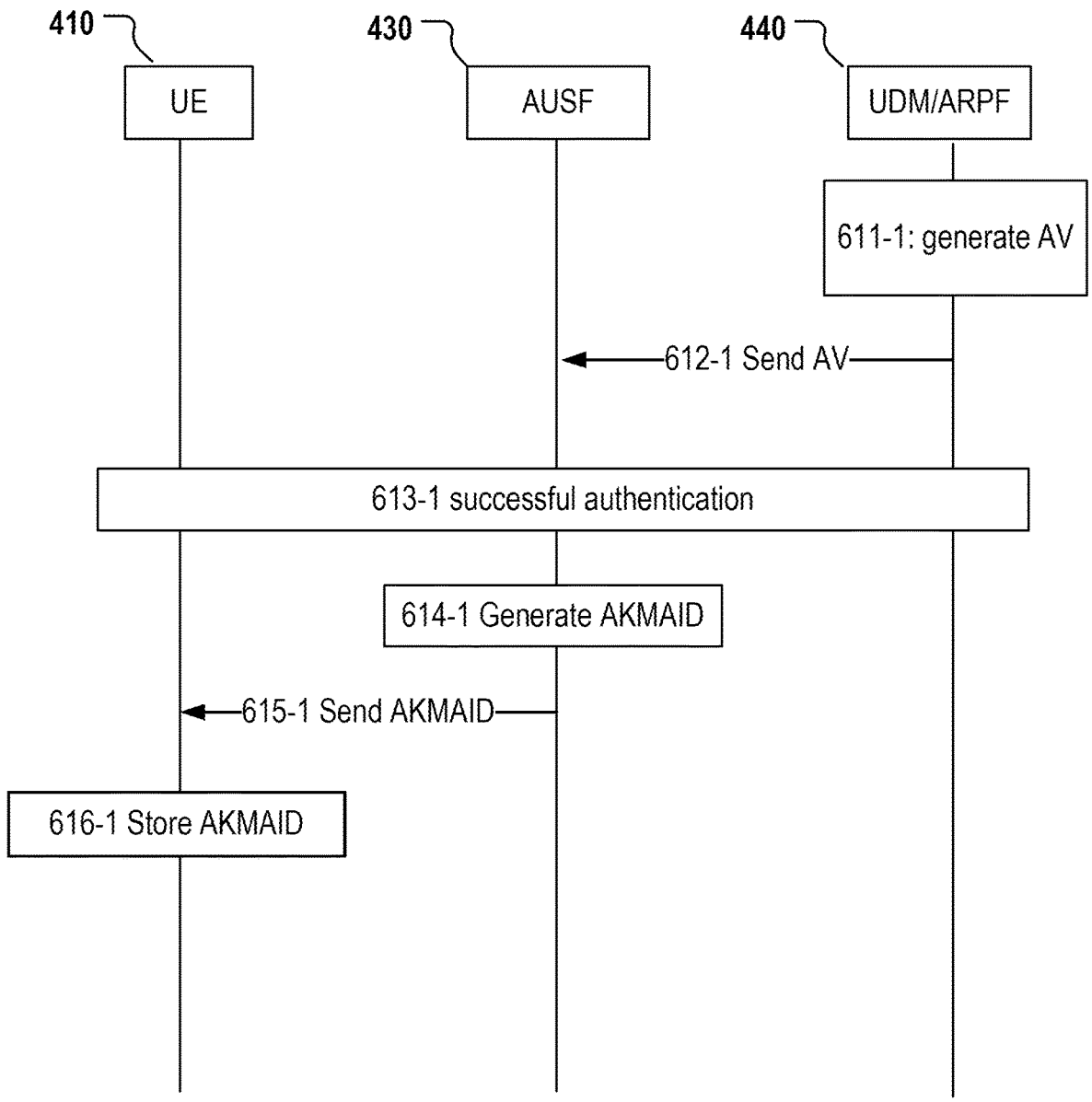
FIG. 7B shows an exemplary logic flow of another implementation for completing an authentication and generating an authentication and key management for service applications identifier (AKMAID).

FIGS. 7A and 7B describes two optional and/or alternative implementations of step 610.

In one implementation in FIG. 7A, step 610 may include step 611: the UDM/ARPF 440 generates an authentication vector (AV) and the AKMAID. In one implementation, the AKMAID may be generated based on an identifier of the UE 410 and a time (e.g., a time of the network). In another implementation, the AKMAID may be generated as a random number. A lifetime of the AKMAID may not be shorter (i.e., be longer than or equal to) a time interval between successive authentication processes.

Referring to FIG. 7A, step 610 may include a portion or all of the following steps: step 612: the UDM/ARPF network node 440 sends the authentication vector and the AKMAID to the AUSF network node 430; step 613: the AUSF network node 430 stores the AKMAID in a storage device (e.g., memory or hard drive); step 614: perform an authentication process; step 615: upon successful authentication, the AUSF 430 sends the AKMAID to the UE 410; and step 616: the UE 410 stores the AKMAID.

In another implementation in FIG. 7B, step 610 may include a portion or all of the following steps: step 611-1: the UDM/ARPF 440 generates an authentication vector (AV); step 612-1: the UDM/ARPF network node 440 sends the authentication vector to the AUSF network node 430; step 613-1: perform an authentication process; step 614-1: upon successful authentication, the AUSF network node 430 generates an AKMAID; step 615-1, the AUSF 430 sends the AKMAID to the UE 410; and step 616-1: the UE 410 stores the AKMAID. In one implementation, the AKMAID may be generated based on an identifier of the UE 410 and a time (e.g., a time of the network). In another implementation, the AKMAID may be generated as a random number. A lifetime of the AKMAID may not be shorter (i.e., be longer than or equal to) a time interval between successive authentication processes.

Referring back to FIG. 6, the method 600 may further include step 620: the UE 410 derives an anchor key (e.g., AKMA key) based on a base authentication key (e.g., AUSF key) in the UE 410, and derives the application key (e.g., AF key) based on the anchor key. The base authentication key in the UE 410 may be obtained by the UE 410 during the authentication process.

Referring to FIG. 6, the method 600 may further include step 625: the AUSF 430 derives an anchor key (e.g., AKMA key) based on a base authentication key (e.g., AUSF key) in the AUSF 430. The base authentication key in the AUSF 430 may be obtained by the AUSF 430 during the authentication process. In one implementation, the step 625 may not occur around the same time as step 620, but occurs before step 640 as described below.

The method 600 may include a portion or all the following steps.

Step 630: the UE 410 sends a communication request to the service application (AF) 460, the communication request comprising the AKMAID.

Step 632: the AF 460, upon receiving the communication request from the UE 410, determines whether the service application has a pre-shared application key for the user equipment.

In response to the determination that the service application does not have the pre-shared application key for the user equipment, step 635: the AF 460 sends a first request for the application key to an AKMA Anchor function (AAnF) network node 450, the first request comprising the AKMAID; step 637: the AAnF network node 450, upon receiving the first request, determines whether the AAnF network node 450 has an anchor key for the AKMAID; in response to the determination that the AAnF network node 450 does not have the anchor key for the AKMAID: step 640: the AAnF 450 sends a second request for the application key to the AUSF network node 430, the second request comprising the AKMAID, and step 642: the AUSF network node 430, upon receiving the second request, retrieve an anchor key in the AUSF network node according to the AKMAID and step 645: sends the anchor key to the AAnF network node, the anchor key in the AUSF network node being pre-derived by the AUSF network node based on a base authentication key in the AUSF network node; step 650: the AAnF network node 450 derives an application key based on the anchor key; step 655: the AAnF network node 450 sends response information to the AF 460, the response information comprising the application key and a parameter of application key lifetime.

Step 660: the AF sends the application session establishment response to the UE 410. Thus, the UE 410 receives the application session establishment response to the communication request from the AF 460 to establish a security communication session between the UE 410 and the AF 460 based on the application key ($K_{AF}$).

Embodiment #2

Figure 8:
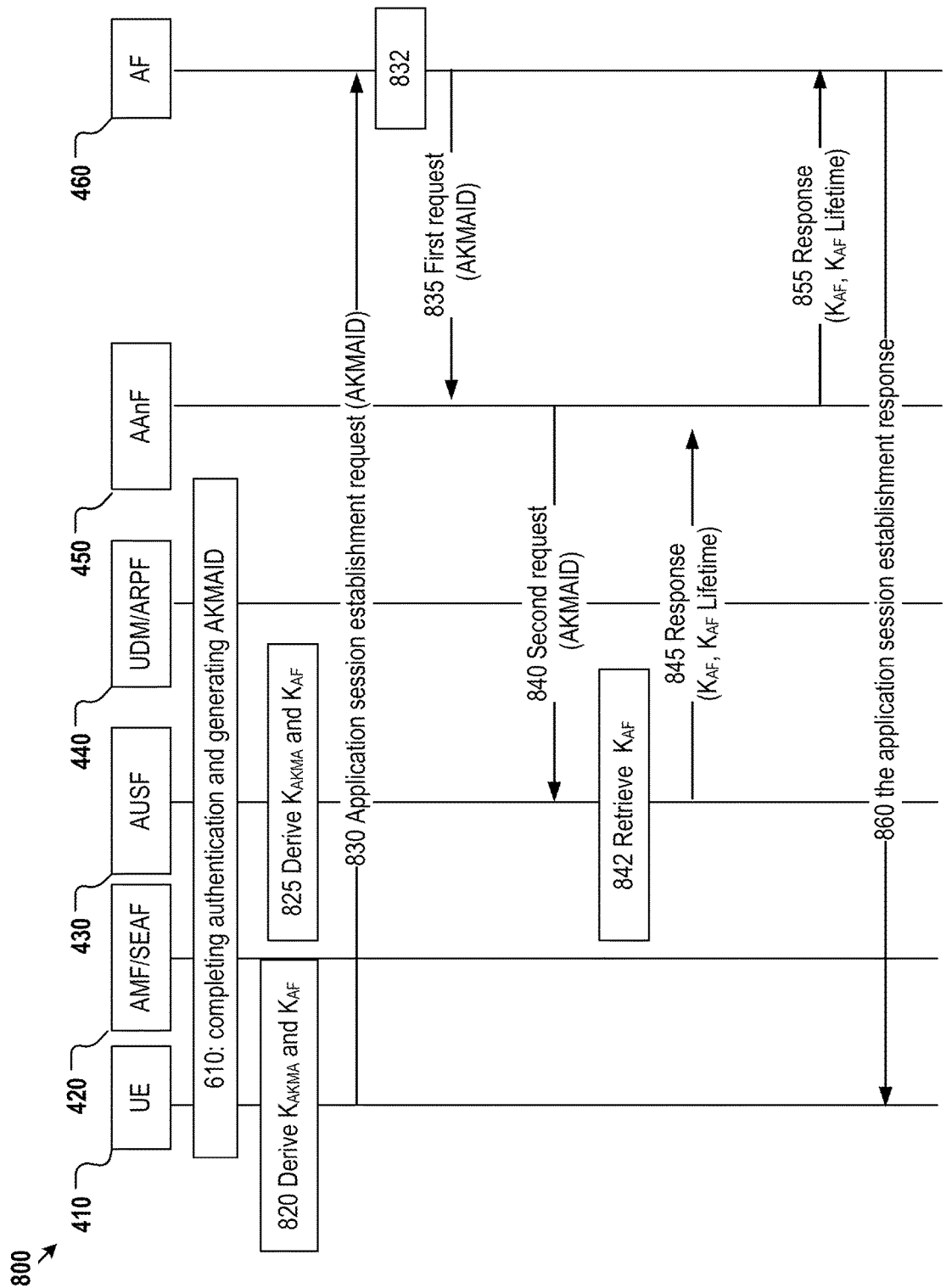
FIG. 8 shows an exemplary logic flow of one embodiment for establishing secure communication between a user equipment and a service application in a communication network.

The present disclosure describe another embodiments of methods and devices for establishing secure communication between a user equipment and a service application in a communication network. FIG. 8 shows exemplary logic flows of a method 800 for establishing secure communication between a user equipment and a service application in a communication network.

The method 800 may include step 610: successfully completing an authentication and generating an authentication process and key management for service applications identifier (AKMAID).

Referring to FIG. 8, the method 800 may further include step 820: the UE 410 derives an anchor key (e.g., AKMA key) based on a base authentication key (e.g., AUSF key) in the UE 410, and derives the application key (e.g., AF key) based on the anchor key. The base authentication key in the UE 410 may be obtained by the UE 410 during the authentication process.

Referring to FIG. 8, the method 800 may further include step 825: the AUSF 430 derives an anchor key (e.g., AKMA key) based on a base authentication key (e.g., AUSF key) in the AUSF 430, and derives the application key (e.g., AF key) based on the anchor key. The base authentication key in the AUSF 430 may be obtained by the AUSF 430 during the authentication process. In one implementation, the step 825 may not occur around the same time as step 820, but occurs before step 840 as described below.

The method 800 may include a portion or all the following steps.

Step 830: the UE 410 sends a communication request to the service application (AF) 460, the communication request comprising the AKMAID.

Step 832: the AF 460, upon receiving the communication request from the UE 410, determines whether the service application has a pre-shared application key for the user equipment.

In response to the determination that the service application does not have the pre-shared application key for the user equipment, step 835: the AF 460 sends a first request for the application key to an AKMA Anchor function (AAnF) network node 450, the first request comprising the AKMAID.

Step 840: the AAnF 450 sends a second request for the application key to the AUSF network node 430, the second request comprising the AKMAID.

Step 842: the AUSF network node 845, upon receiving the second request, retrieve the application key in the AUSF network node according to the AKMAID. The application key in the AUSF network node being pre-derived by the AUSF network node based on the pre-derived anchor key in the AUSF network node.

Step 845: the AUSF network node 845 sends the application key and a parameter of application key lifetime to the AAnF network node.

Step 855: the AAnF network node 450 sends response information to the AF 460, the response information comprising the application key and the parameter of application key lifetime.

Step 860: the AF sends the application session establishment response to the UE 410. Thus, the UE 410 receives the application session establishment response to the communication request from the AF 460 to establish a security communication session between the UE 410 and the AF 460 based on the application key (KAF).

Embodiment #3

Figure 9:
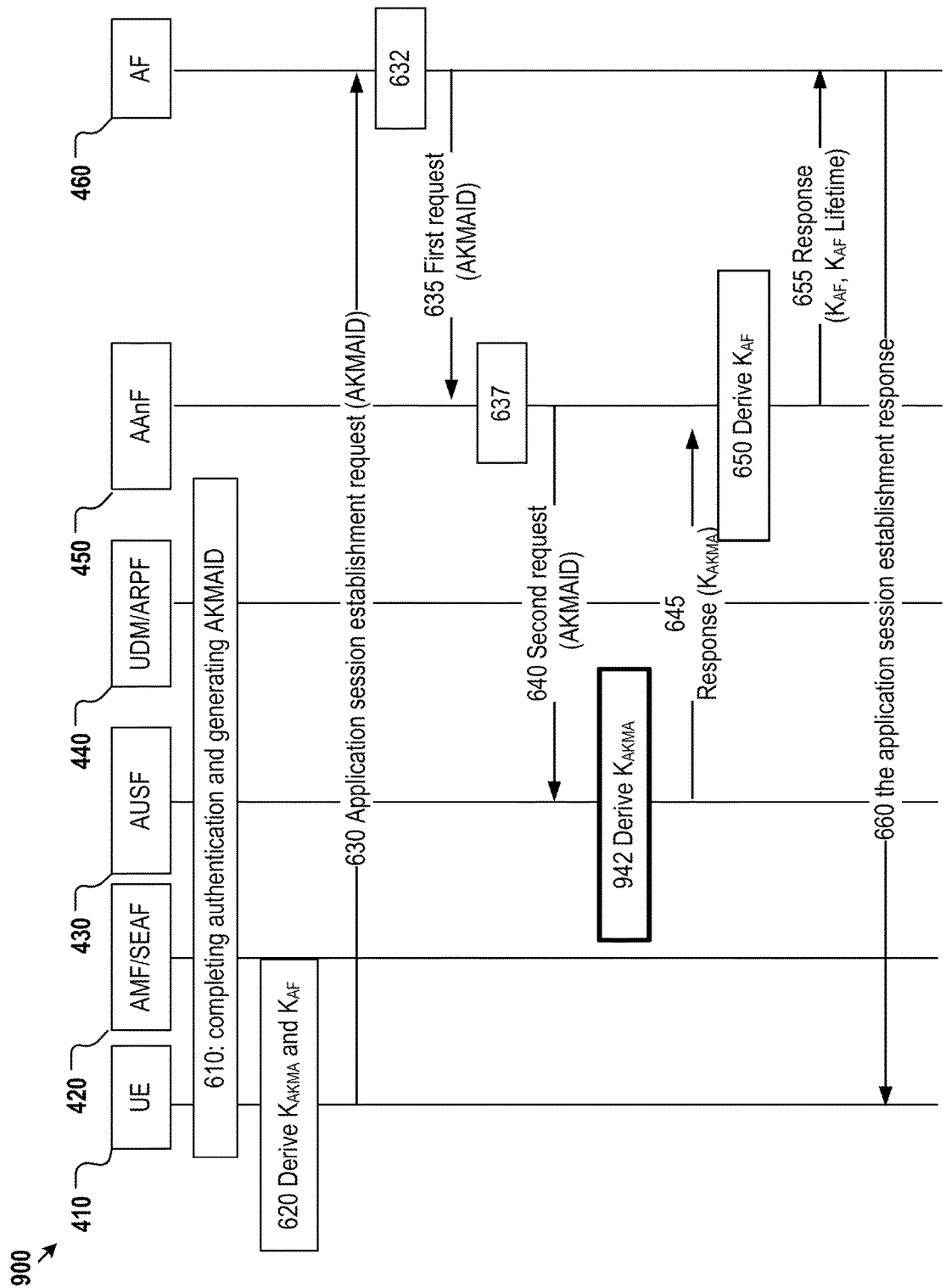
FIG. 9 shows an exemplary logic flow of one embodiment for establishing secure communication between a user equipment and a service application in a communication network.

The present disclosure describe another embodiments of methods and devices for establishing secure communication between a user equipment and a service application in a communication network. FIG. 9 shows exemplary logic flows of a method 900 for establishing secure communication between a user equipment and a service application in a communication network. In this embodiment, the AUSF network node 430 may derive an anchor key (e.g., AKMA key) "on-demand" (i.e., upon receiving request from the AAnF 450).

The method 900 may be slightly different from the method 600 in FIG. 6: deriving an anchor key (e.g., AKMA Key) in step 942 occurs after step 640 in method 900;

differently, deriving an anchor key (e.g., AKMA key) in step 625 occurs before step 640 in method 600.

Step 942 may include that, the AUSF network node 430, upon receiving the second request, retrieves a base authentication key (e.g., AUSF key) in the AUSF network node according to the AKMAID, and derives an anchor key (e.g., AKMA key) based on the base authentication key (e.g., AUSF key) in the AUSF 430. The base authentication key in the AUSF 430 may be obtained by the AUSF 430 during the authentication process.

Other steps in method 900 may be referred to the described method 600 in FIG. 6.

Embodiment #4

Figure 10:
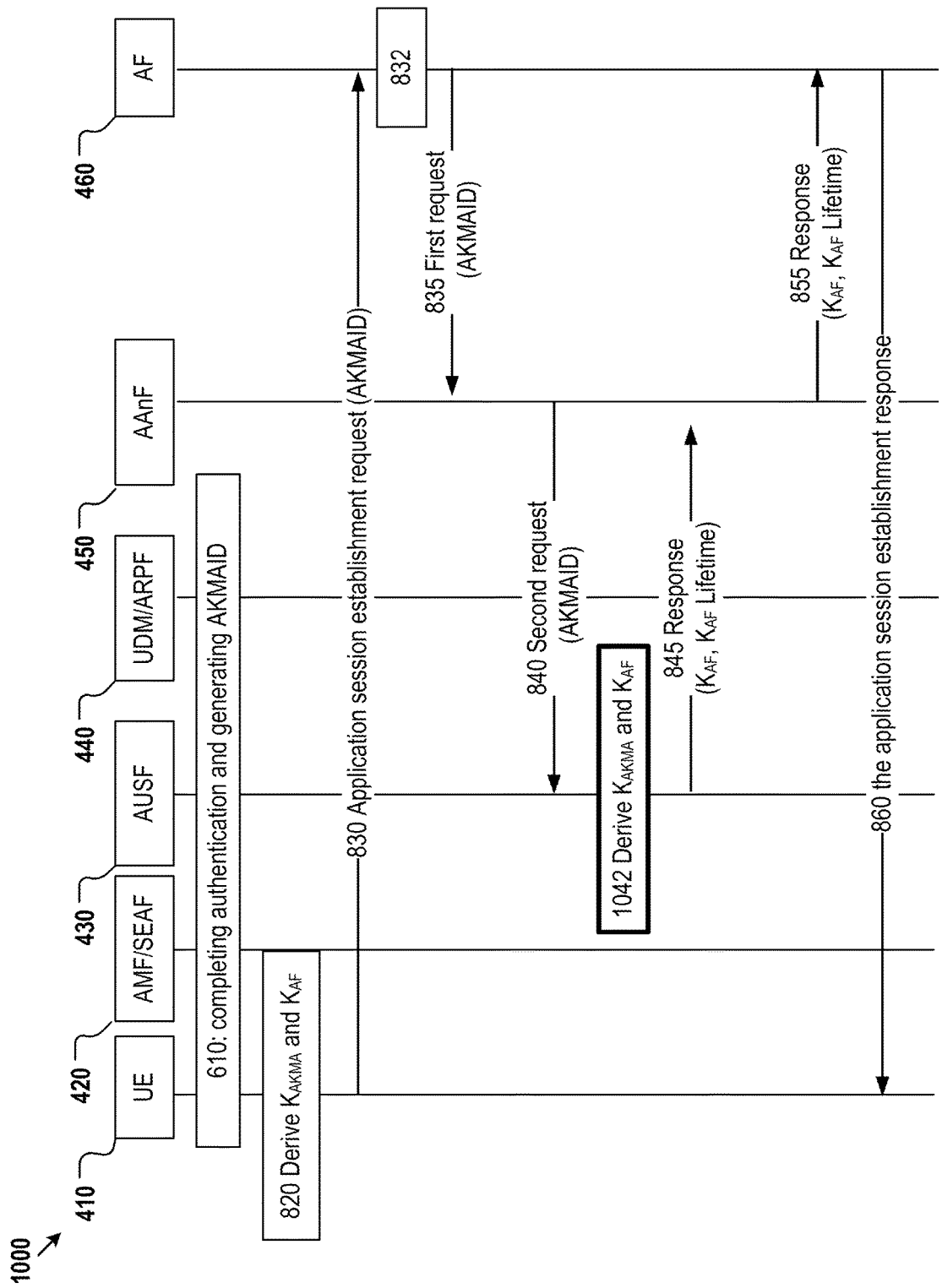
FIG. 10 shows an exemplary logic flow of one embodiment for establishing secure communication between a user equipment and a service application in a communication network.

The present disclosure describe another embodiments of methods and devices for establishing secure communication between a user equipment and a service application in a communication network. FIG. 10 shows exemplary logic flows of a method 1000 for establishing secure communication between a user equipment and a service application in a communication network.

The method 1000 may be slightly different from the method 800 in FIG. 8: deriving an anchor key (e.g., AKMA Key) and an application key (e.g., $K_{AF}$) in step 1042 occurs after step 840 in method 1000; differently, deriving an anchor key (e.g., AKMA Key) and an application key (e.g., $K_{AF}$) in step 825 occurs before step 840 in method 800.

Step 1042 may include that, the AUSF network node 430, upon receiving the second request, retrieves a base authentication key (e.g., AUSF key) in the AUSF network node according to the AKMAID, derives an anchor key (e.g., AKMA key) based on the base authentication key (e.g., AUSF key) in the AUSF 430, and derives an application key (e.g., $K_{AF}$) based on the anchor key (e.g., AKMA key). The base authentication key in the AUSF 430 may be obtained by the AUSF 430 during the authentication process.

Other steps in method 1000 may be referred to the described method 800 in FIG. 8.

Embodiment #5

Figure 11:
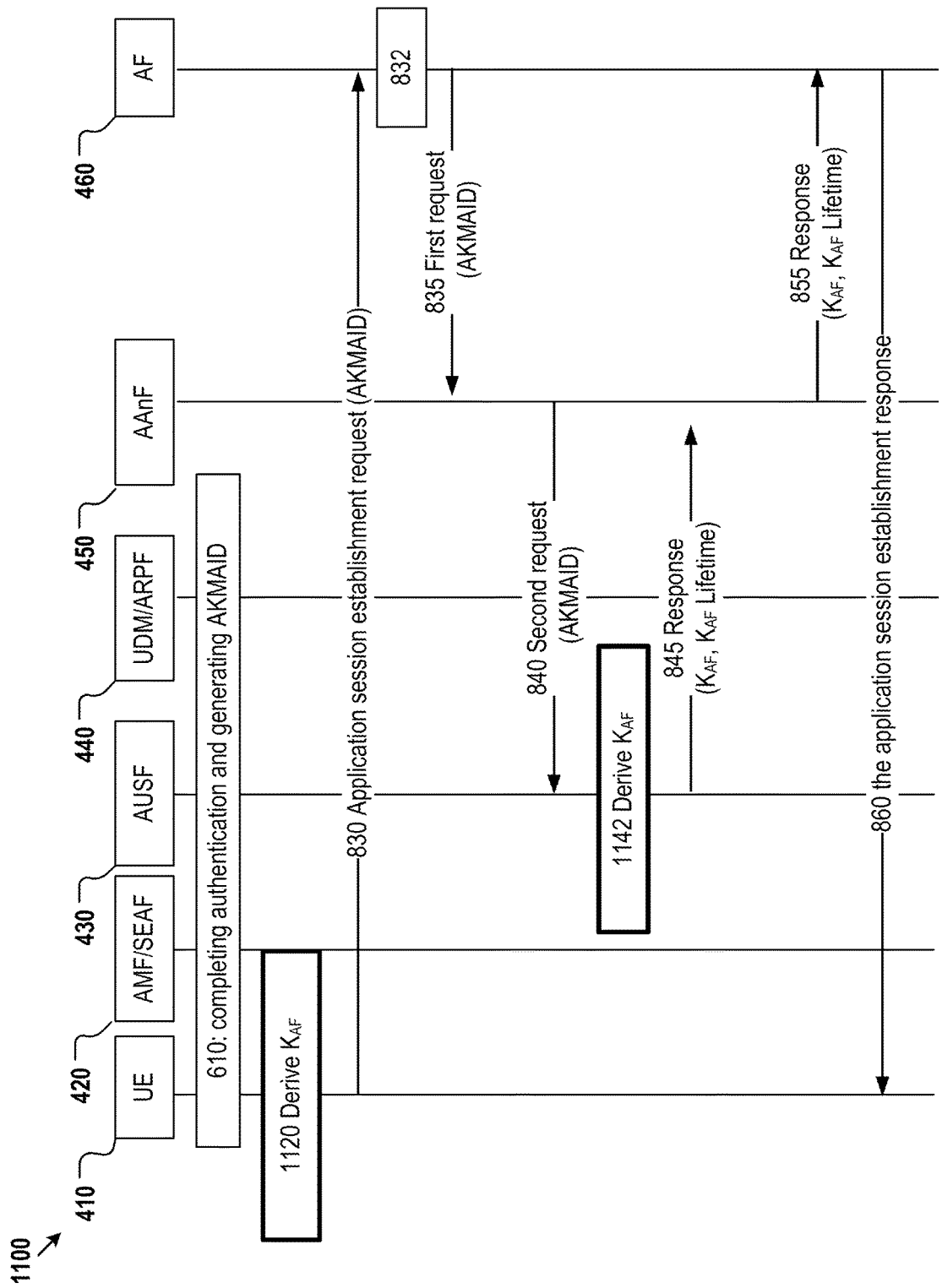
FIG. 11 shows an exemplary logic flow of one embodiment for establishing secure communication between a user equipment and a service application in a communication network.

The present disclosure describe another embodiments of methods and devices for establishing secure communication between a user equipment and a service application in a communication network. FIG. 11 shows exemplary logic flows of a method 1100 for establishing secure communication between a user equipment and a service application in a communication network. In this embodiment, an application key (e.g., $K_{AF}$) may be directly derived based on a base authentication key (e.g., AUSF key); and the AUSF 430 may derive an application key (e.g., $K_{AF}$) on-demand.

The method 1100 may be slightly different from the method 1000 in FIG. 10: deriving an application key (e.g., $K_{AF}$) based on a base authentication key (e.g., AUSF key) in step 1120 and step 1142 in method 1100; differently, deriving an application key (e.g., $K_{AF}$) based on an anchor key (e.g., AKMA Key) in step 820 and step 1042 in method 1000.

Step 1120 may include that, the UE 410 derives an application key (e.g., AF key) based on a base authentication key (e.g., AUSF key) in the UE 410. The base authentication key in the UE 410 may be obtained by the UE 410 during the authentication process.

Step 1142 may include that, the AUSF network node 430, upon receiving the second request, retrieves a base authentication key (e.g., AUSF key) in the AUSF network node according to the AKMAID, and derives an application key (e.g., $K_{AF}$) based on a base authentication key (e.g., AUSF key) in the AUSF 430. The base authentication key in the AUSF 430 may be obtained by the AUSF 430 during the authentication process.

Other steps in method 1100 may be referred to the described method 1000 in FIG. 10.

Embodiment #6

Figure 12:
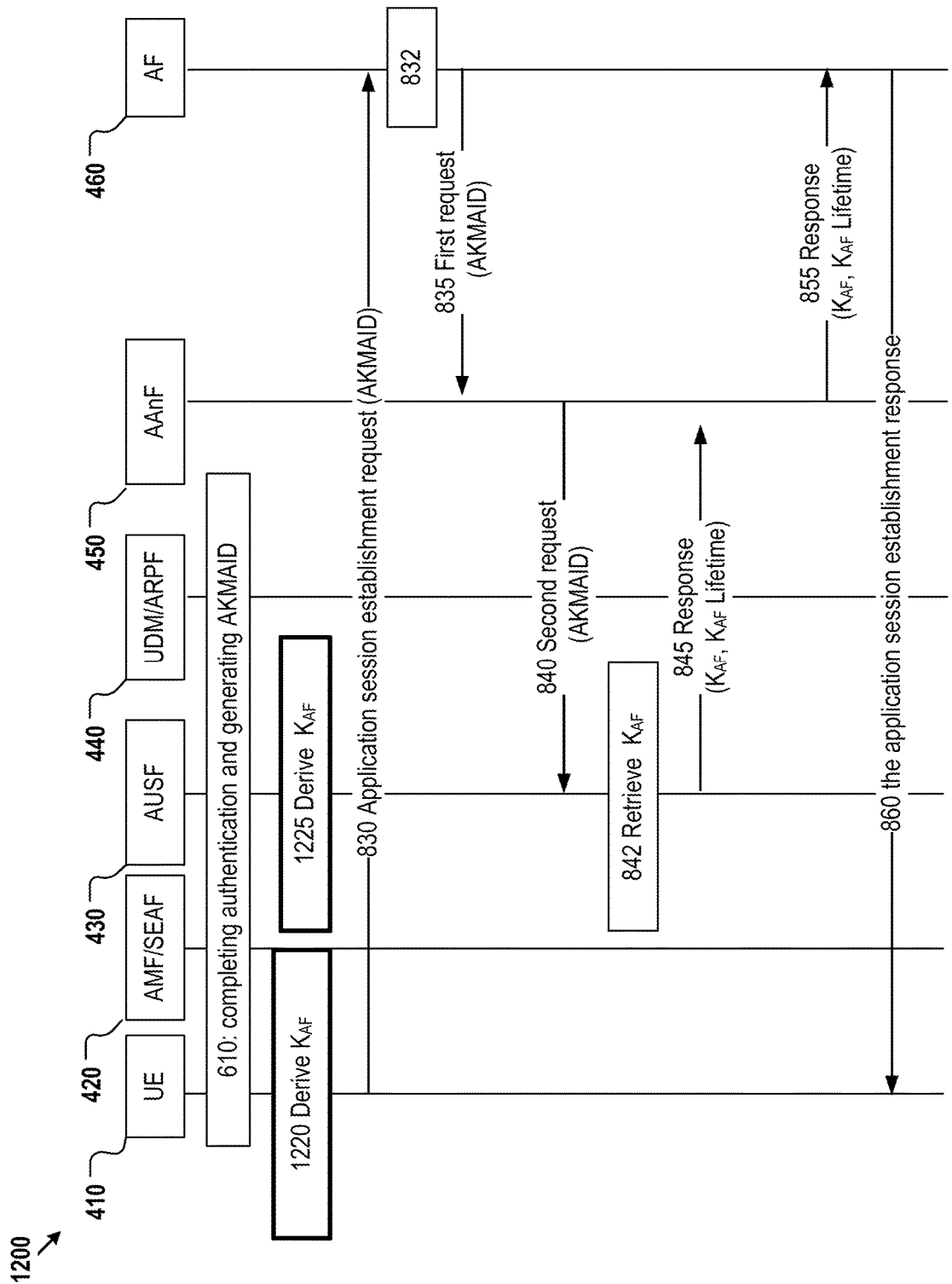
FIG. 12 shows an exemplary logic flow of one embodiment for establishing secure communication between a user equipment and a service application in a communication network.

The present disclosure describe another embodiments of methods and devices for establishing secure communication between a user equipment and a service application in a communication network. FIG. 12 shows exemplary logic flows of a method 1100 for establishing secure communication between a user equipment and a service application in a communication network. In this embodiment, an application key (e.g., $K_{AF}$) may be directly derived based on a base authentication key (e.g., AUSF key); and the AUSF 430 may pre-derive an application key (e.g., $K_{AF}$). In this disclosure, "pre-derive a key" may refer to "derive the key prior to receiving request for the key".

The method 1200 may be slightly different from the method 800 in FIG. 8: deriving an application key (e.g., $K_{AF}$) based on a base authentication key (e.g., AUSF key) in step 1220 and step 1225 in method 1200; differently, deriving an application key (e.g., $K_{AF}$) based on an anchor key (e.g., AKMA Key) in step 820 and step 825 in method 800.

Step 1220 may include that, the UE 410 derives an application key (e.g., AF key) based on a base authentication key (e.g., AUSF key) in the UE 410. The base authentication key in the UE 410 may be obtained by the UE 410 during the authentication process.

Step 1225 may include that, the AUSF network node 430 derives an application key (e.g., $K_{AF}$) based on a base authentication key (e.g., AUSF key) in the AUSF 430. The base authentication key in the AUSF 430 may be obtained by the AUSF 430 during the authentication process.

Other steps in method 1200 may be referred to the described method 800 in FIG. 8.

Embodiment #7

Figure 13:
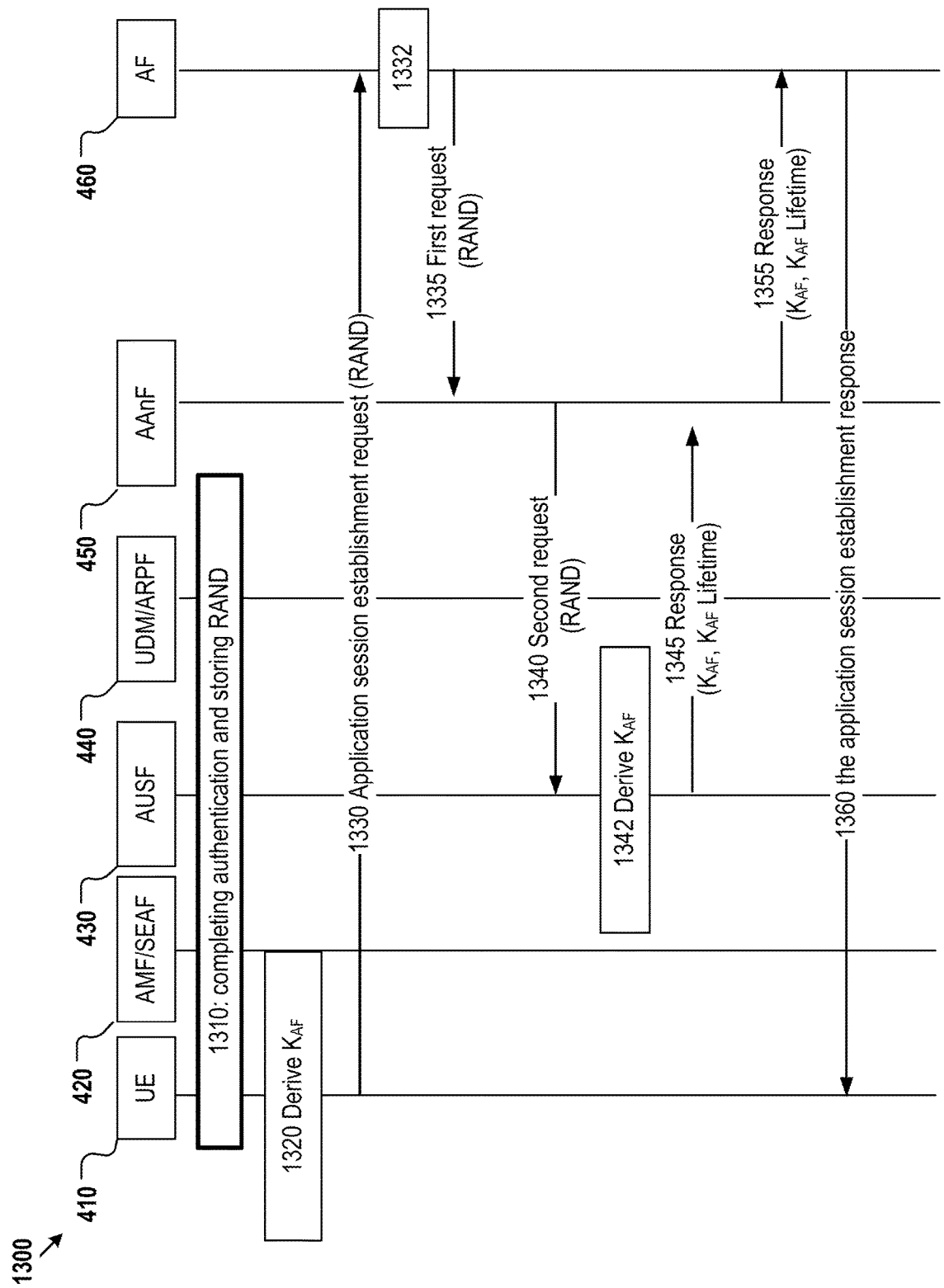
FIG. 13 shows an exemplary logic flow of one embodiment for establishing secure communication between a user equipment and a service application in a communication network.

The present disclosure describe embodiments of methods and devices for establishing secure communication between a user equipment and a service application in a communication network. FIG. 13 shows exemplary logic flows of a method 1300 for establishing secure communication between a user equipment and a service application in a communication network.

There are some difference between the method 1300 and the method 1100 in FIG. 11. One difference is that a different identifier is used for application session establishment process: a random number (RAND) of an authentication vector is used as the identifier in method 1300; and differently, an authentication and key management for service applications identifier (AKMAID) is used as the identifier in method 1100 in FIG. 11.

The method 1300 may include step 1310: successfully completing an authentication and storing the RAND by the UE 410 and by the AUSF 430. The authentication process may be a primary authentication process for registering the UE 410 with the communication network.

Figure 14:
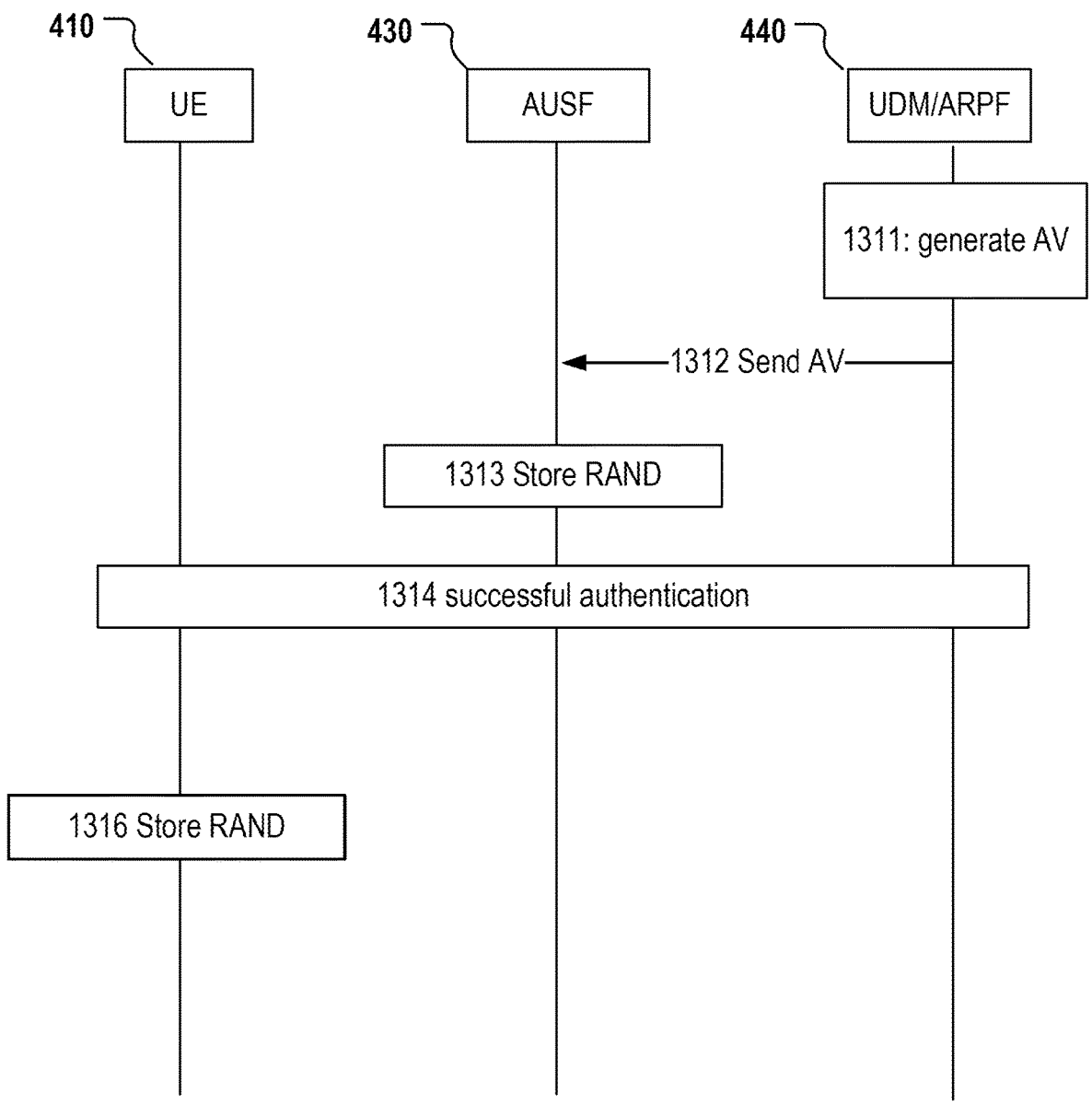
FIG. 14 shows an exemplary logic flow of one implementation for completing an authentication and storing a random number (RAND) in an authentication vector.

FIG. 14 describes one implementations of step 1310. Step 1310 may include step 1311: the UDM/ARPF 440 generates an authentication vector (AV). The AV may have one or more elements, and the RAND is one element of the AV. In one implementation, the RAND may be generated as a random number. In another implementation, the authentication vector generated by the UDM/ARPF 440 may include, for example, an authentication token (AUTN), a random number (RAND), and/or various authentication keys. The AKMA service subscription information for the UE may include, for example, identifiers for one or more AAnFs, and or validity time period of the AKMA anchor key.

Referring back to FIG. 13, the method 1300 may further include a portion or all of the following steps.

Step 1320: the UE 410 derives the application key (e.g., AF key) based on a base authentication key (e.g., AUSF key) in the UE 410. The base authentication key in the UE 410 may be obtained by the UE 410 during the authentication process.

Step 1330: the UE 410 sends a communication request to the service application (AF) 460, the communication request comprising the RAND.

Step 1332: the AF 460, upon receiving the communication request from the UE 410, determines whether the service application has a pre-shared application key for the user equipment.

In response to the determination that the service application does not have the pre-shared application key for the user equipment, step 1335: the AF 460 sends a first request for the application key to an AKMA Anchor function (AAnF) network node 450, the first request comprising the RAND.

Step 1340: the AAnF 450 sends a second request for the application key to the AUSF network node 430, the second request comprising the RAND.

Step 1342: Step 1325: the AUSF 430, upon receiving the second request, retrieve a base authentication key (e.g., AUSF key) in the AUSF 430 according to the RAND. The base authentication key in the AUSF 430 may be obtained by the AUSF 430 during the authentication process.

Step 1345: the AUSF network node 845 sends the application key and a parameter of application key lifetime to the AAnF network node.

Step 1355: the AAnF network node 450 sends response information to the AF 460, the response information comprising the application key and the parameter of application key lifetime.

Step 1360: the AF sends the application session establishment response to the UE 410. Thus, the UE 410 receives the application session establishment response to the communication request from the AF 460 to establish a security communication session between the UE 410 and the AF 460 based on the application key ($K_{AF}$).

Embodiment #8

Figure 15:
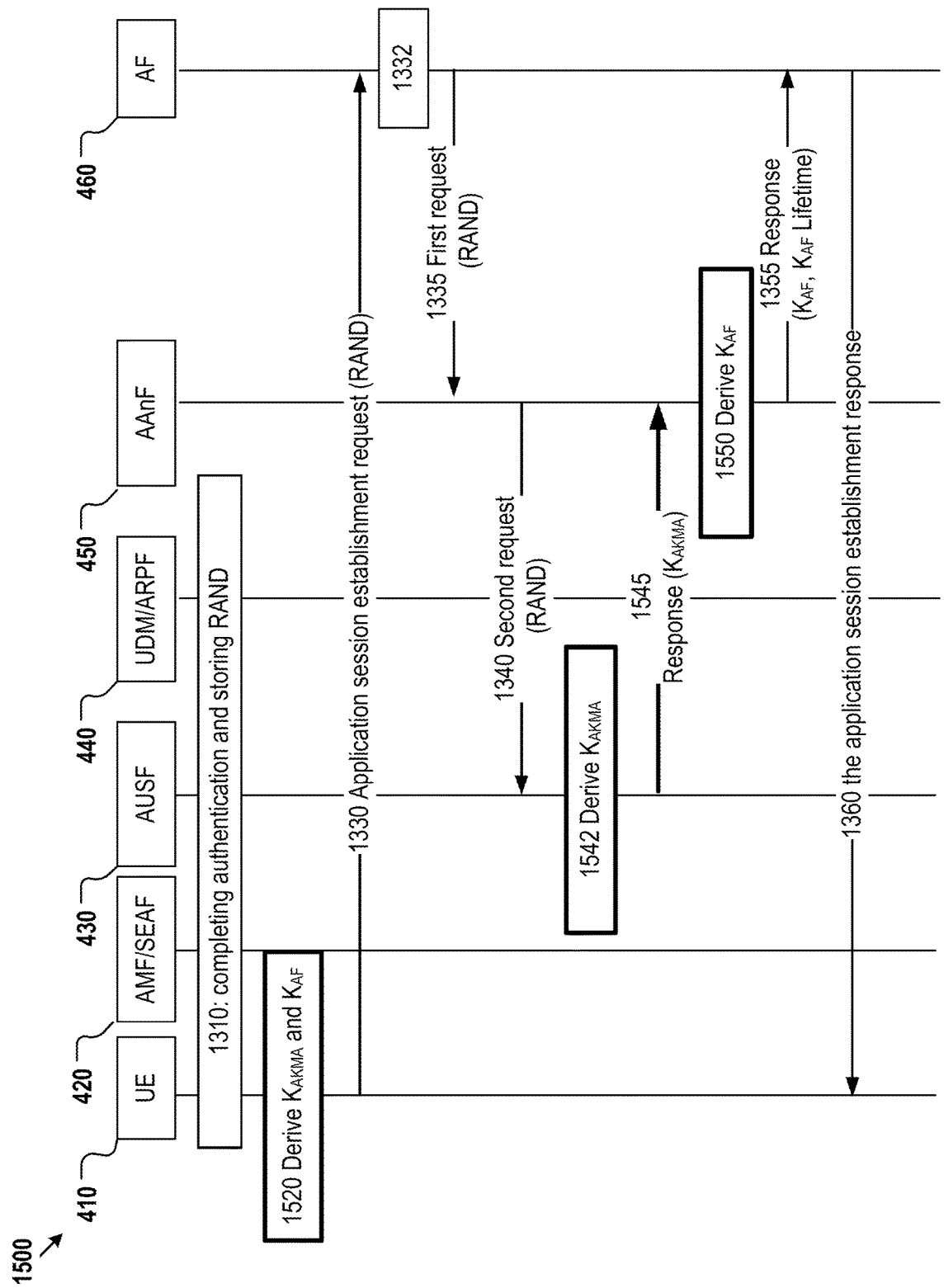
FIG. 15 shows an exemplary logic flow of one embodiment for establishing secure communication between a user equipment and a service application in a communication network.

The present disclosure describe another embodiments of methods and devices for establishing secure communication between a user equipment and a service application in a communication network. FIG. 15 shows exemplary logic flows of a method 1500 for establishing secure communication between a user equipment and a service application in a communication network.

The method 1500 may be different from the method 1300 in FIG. 13: deriving an anchor key (e.g., AKMA key) and an application key (e.g., $K_{AF}$) in step 1520, deriving an anchor key (e.g., AKMA key) in step 1542, and deriving an application key (e.g., $K_{AF}$) in step 1550 in method 1500; differently, deriving an application key (e.g., $K_{AF}$) in step 1320 and deriving an application key (e.g., $K_{AF}$) in step 1342 in method 1300.

Step 1520 may include that, the UE 410 derives an anchor key (e.g., AKMA key) based on a base authentication key (e.g., AUSF key) in the UE 410, and derives the application key (e.g., AF key) based on the anchor key. The base authentication key in the UE 410 may be obtained by the UE 410 during the authentication process.

Step 1542 may include that, the AUSF network node 430, upon receiving the second request, retrieves a base authentication key (e.g., AUSF key) in the AUSF network node according to the RAND, and derives an anchor key (e.g., AKMA key) based on the base authentication key (e.g., AUSF key) in the AUSF 430. The base authentication key in the AUSF 430 may be obtained by the AUSF 430 during the authentication process.

Step 1545 may include that, the AUSF network node 430 sends the anchor key to the AAnF network node 450.

Step 1550 may include that, the AAnF network node 450 derives an application key based on the anchor key.

Other steps in method 1500 may be referred to the described method 1300 in FIG. 13.

The present disclosure describes methods, apparatus, and computer-readable medium for wireless communication. The present disclosure addressed the issues with establishing secure communication between a user equipment and a service application in a communication network. The methods, devices, and computer-readable medium described in the present disclosure may facilitate the performance of secure communications and enhance security of wireless communication, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
    establishing secure communication between a user equipment and a service application in a communication network by performing:
        receiving, by the user equipment, an authentication and key management for service applications identifier (AKMAID) from an authentication server function (AUSF) network node upon successful completion of an authentication process for registering the user equipment with the communication network;
        storing, by the user equipment, the AKMAID;

deriving, by the user equipment, an application key based on a base authentication key;

sending, by the user equipment, a communication request to the service application, the communication request comprising the AKMAID; and receiving, by the user equipment, an application session establishment response to the communication request from the service application to establish a secure communication session between the user equipment and the service application based on the application key, wherein:
the service application, upon receiving the communication request from the user equipment, determines whether the service application has a pre-shared application key for the user equipment, and in response to the determination that the service application does not have the pre-shared application key for the user equipment, the service application sends a first request for the application key to an AKMA Anchor function (AAnF) network node, the first request comprising the AKMAID.

2. The method according to claim 1, wherein:
a user data management/authentication credential repository and processing function (UDM/ARPF) network node generates an authentication vector and the AKMAID;

the UDM/ARPF network node sends the authentication vector and the AKMAID to the AUSF network node; and the AUSF network node stores the AKMAID in a storage device.

3. The method according to claim 1, wherein:
a user data management/authentication credential repository and processing function (UDM/ARPF) network node generates an authentication vector;

the UDM/ARPF network node sends the authentication vector to the AUSF network node; and the AUSF network node generates the AKMAID and stores the AKMAID in a storage device upon successful completion of the authentication process for registering the user equipment with the communication network.

4. The method according to claim 2, wherein:
the AKMAID is generated based on an identifier of the user equipment and a time, or is generated as a random number; and a lifetime of the AKMAID is longer than or equal to a time interval between successive authentication processes.

5. The method according to claim 1, wherein deriving, by the user equipment, the application key based on the base authentication key comprises:

deriving, by the user equipment, an anchor key based on the base authentication key; and deriving, by the user equipment, the application key based on the anchor key.

6. The method according to claim 5, wherein:
the AAnF network node, upon receiving the first request, determines whether the AAnF network node has an anchor key for the AKMAID;

in response to the determination that the AAnF network node does not have the anchor key for the AKMAID:
the AAnF network node sends a second request for the application key to the AUSF network node, the second request comprising the AKMAID, and the AUSF network node, upon receiving the second request, retrieve an anchor key in the AUSF network node according to the AKMAID and sends the anchor key to the AAnF network node, the anchor key in the AUSF network node being pre-derived by the AUSF network node based on a base authentication key in the AUSF network node;

the AAnF network node derives an application key based on the anchor key;

the AAnF network node sends response information to the service application, the response information comprising the application key and a parameter of application key lifetime; and the service application sends the application session establishment response to the user equipment.

7. The method according to claim 1, wherein:
the AAnF network node, upon receiving the first request, sends a second request for the application key to the AUSF network node, the second request comprising the AKMAID;

the AUSF network node, upon receiving the second request, retrieves a base authentication key in the AUSF network node according to the AKMAID, and derives an application key based on the base authentication key in the AUSF network node;

the AUSF network node sends first response information to the service application, the first response information comprising the application key and a parameter of application key lifetime;

the AAnF network node sends second response information to the service application, the second response information comprising the application key and the parameter of application key lifetime; and the service application sends the application session establishment response to the user equipment.

8. The method according to claim 1, wherein:
the AAnF network node, upon receiving the first request, sends a second request for the application key to the AUSF network node, the second request comprising the AKMAID;

the AUSF network node, upon receiving the second request, retrieves an application key in the AUSF network node according to the AKMAID, the application key being pre-derived based on the base authentication key in the AUSF network node;

the AUSF network node sends first response information to the service application, the first response information comprising the application key and a parameter of application key lifetime;

the AAnF network node sends second response information to the service application, the second response information comprising the application key and the parameter of application key lifetime; and the service application sends the application session establishment response to the user equipment.

9. A non-transitory computer-readable program medium storing instructions, wherein, the instructions, when executed by a processor, are configured to cause the processor to implement the method according to claim 1.

10. A method for wireless communication, comprising:
establishing secure communication between a user equipment and a service application in a communication network by performing:

receiving, by an authentication server function (AUSF) network node, an authentication vector from a user data management/authentication credential repository and processing function (UDM/ARPF) network node;

storing, by the AUSF network node, an authentication and key management for service applications identifier (AKMAID); and sending, by the AUSF network node, the AKMAID to the user equipment upon successful completion of an authentication process for registering the user equipment with the communication network, so that the user equipment is configured to:

store the AKMAID, derive an application key based on a base authentication key, send a communication request to the service application, the communication request comprising the AKMAID, and receive an application session establishment response to the communication request from the service application to establish a secure communication session between the user equipment and the service application based on the application key, wherein:

the service application, upon receiving the communication request from the user equipment, determines whether the service application has a pre-shared application key for the user equipment, and in response to the determination that the service application does not have the pre-shared application key for the user equipment, the service application sends a first request for the application key to an AKMA Anchor function (AAnF) network node, the first request comprising the AKMAID.

11. The method according to claim 10, further comprising:

receiving, by the AUSF network node along with receiving the authentication vector, the AKMAID from the UDM/ARPF network node for storage, the authentication vector and the AKMAID being generated by the UDM/ARPF network node.

12. The method according to claim 10, wherein:

generating, by the AUSF network node upon successful completion of an authentication process for registering the user equipment with the communication network, the AKMAID.

13. The method according to claim 11, wherein:

the AKMAID is generated based on an identifier of the user equipment and a time, or is generated as a random number; and a lifetime of the AKMAID is longer than or equal to a time interval between successive authentication processes.

14. The method according to claim 10, wherein:

the user equipment derives an anchor key based on the base authentication key; and the user equipment derives the application key based on the anchor key.

15. The method according to claim 14, wherein:

the AAnF network node, upon receiving the first request, determines whether the AAnF network node has an anchor key for the AKMAID;

in response to the determination that the AAnF network node does not have the anchor key for the AKMAID:

the AAnF network node sends a second request for the application key to the AUSF network node, the second request comprising the AKMAID, and the method further comprises:

receiving, by the AUSF network node, the second request for the application key from the AAnF network node, retrieving, by the AUSF network node, an anchor key in the AUSF network node according to the AKMAID in the second request, the anchor key in the AUSF network node being pre-derived by the AUSF network node based on a base authentication key in the AUSF network node, and sending, by the AUSF network node, the anchor key to the AAnF network node;

the AAnF network node derives an application key based on the anchor key;

the AAnF network node sends response information to the service application, the response information comprising the application key and a parameter of application key lifetime; and the service application sends the application session establishment response to the user equipment.

16. The method according to claim 10, wherein:

the AAnF network node, upon receiving the first request, sends a second request for the application key to the AUSF network node, the second request comprising the AKMAID;

the method further comprises:

receiving, by the AUSF network node, the second request for the application key from the AAnF network node, retrieving, by the AUSF network node, a base authentication key in the AUSF network node according to the AKMAID, and deriving an application key based on the base authentication key in the AUSF network node, and sending, by the AUSF network node, first response information to the service application, the first response information comprising the application key and a parameter of application key lifetime;

the AAnF network node sends second response information to the service application, the second response information comprising the application key and the parameter of application key lifetime; and the service application sends the application session establishment response to the user equipment.

17. The method according to claim 10, wherein:

the AAnF network node, upon receiving the first request, sends a second request for the application key to the AUSF network node, the second request comprising the AKMAID;

the method further comprises:

receiving, by the AUSF network node, the second request for the application key from the AAnF network node, retrieving, by the AUSF network node, an application key in the AUSF network node according to the AKMAID, the application key being pre-derived based on the base authentication key in the AUSF network node, and sending, by the AUSF network node, first response information to the service application, the first response information comprising the application key and a parameter of application key lifetime;

the AAnF network node sends second response information to the service application, the second response information comprising the application key and the parameter of application key lifetime; and the service application sends the application session establishment response to the user equipment.

18. An apparatus comprising:
a memory storing instructions; and
a processor in communication with the memory, wherein, when the processor executes the instructions, the processor is configured to cause the apparatus to perform the method according to claim 10.

19. A non-transitory computer-readable program medium storing instructions, wherein, the instructions, when executed by a processor, are configured to cause the processor to implement the method according to claim 10.

20. An apparatus comprising:
a memory storing instructions; and
a processor in communication with the memory, wherein, when the processor executes the instructions, the processor is configured to cause the apparatus to perform:
  establishing secure communication between the apparatus and a service application in a communication network by performing:
    receiving an authentication and key management for service applications identifier (AKMAID) from an authentication server function (AUSF) network node upon successful completion of an authentication process for registering the apparatus with the communication network;
    storing the AKMAID;
    deriving an application key based on a base authentication key;
    sending a communication request to the service application, the communication request comprising the AKMAID; and
    receiving an application session establishment response to the communication request from the service application to establish a secure communication session between the apparatus and the service application based on the application key, wherein:
  the service application, upon receiving the communication request from the user equipment, determines whether the service application has a pre-shared application key for the user equipment, and
  in response to the determination that the service application does not have the pre-shared application key for the user equipment, the service application sends a first request for the application key to an AKMA Anchor function (AAnF) network node, the first request comprising the AKMAID.

* * * * *